(12) United States Patent
Ishida et al.

(10) Patent No.: US 7,163,000 B2
(45) Date of Patent: Jan. 16, 2007

(54) ENGINE CONTROL DEVICE

(75) Inventors: Yasuhiko Ishida, Hyogo (JP); Yoshimasa Kinoshita, Shizuoka-ken (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/082,256

(22) Filed: Mar. 17, 2005

(65) Prior Publication Data

US 2006/0157026 A1    Jul. 20, 2006

(30) Foreign Application Priority Data

Jan. 14, 2005    (JP) .............................. 2005-007470

(51) Int. Cl.
  *F02D 11/10* (2006.01)
  *F02D 11/00* (2006.01)

(52) U.S. Cl. ...................... 123/399; 123/395

(58) Field of Classification Search ................ 123/395, 123/396, 397, 398, 399, 400
See application file for complete search history.

(56) References Cited

U.S. PATENT DOCUMENTS

| | | | | |
|---|---|---|---|---|
| 4,735,179 A | * | 4/1988 | Ejiri et al. ................... | 123/332 |
| 4,947,815 A | * | 8/1990 | Peter .......................... | 123/399 |
| 5,975,051 A | * | 11/1999 | Yamada et al. ............. | 123/396 |
| 6,009,853 A | * | 1/2000 | Fujikawa et al. ........... | 123/396 |
| 6,047,679 A | * | 4/2000 | Matsumoto et al. ........ | 123/396 |
| 6,240,899 B1 | * | 6/2001 | Yamada et al. ............. | 123/396 |
| 2004/0069271 A1 | * | 4/2004 | Kanno et al. ............... | 123/396 |

FOREIGN PATENT DOCUMENTS

JP    2004-092640    3/2004

OTHER PUBLICATIONS

Co-pending U.S. Appl. No. 11/082,792, filed Mar. 17, 2005. Title: Engine Control Device. Inventors: Yoshimasa Kinoshita.
Co-pending U.S. Appl. No. 11/083,290, filed Mar. 17, 2005. Title: Engine Control Device. Inventor: Yasuhiko Ishida et al.

* cited by examiner

*Primary Examiner*—Mahmoud Gimie
(74) *Attorney, Agent, or Firm*—Knobbe, Martens, Olson & Bear, LLP

(57) ABSTRACT

An engine control device can include a throttle valve for adjusting an amount of air supplied to an engine, operation amount detecting sensors for detecting an operation amount of a throttle lever, a motor for driving the throttle valve between open and closed positions according to detection values of the operation amount detecting sensor 21*a* or the like, and throttle opening detecting sensors for detecting an opening of the throttle valve is provided with a limp-home mechanism for keeping the throttle valve in a mechanically neutral position when an abnormality occurs. When the throttle valve is in the mechanically neutral position, an ignition timing control can be switched in a stepwise manner over a predetermined time period from a regular ignition timing control to a limp-home ignition timing control.

12 Claims, 17 Drawing Sheets

ENGINE CONTROL DEVICE

PRIORITY INFORMATION

This application is based on and claims priority under 35 U.S.C. §119 to Japanese Patent Application No. 2005-007470, filed on Jan. 14, 2005, the entire contents of which is hereby expressly incorporated by reference herein.

BACKGROUND OF THE INVENTIONS

1. Field of the Inventions

The present inventions relate to an engine control device including modes for engine operation during malfunctions, and more specifically, during induction system malfunctions.

2. Description of the Related Art

Conventionally, for example in a small boat, an operation or displacement amount of an operating lever, also referred to as a "torque request device" or a "throttle lever", by a boat operator is detected by an operation amount detecting sensor. In these types of watercraft an engine control device is typically used to control an electronically controlled throttle valve that adjusts an amount of air supplied to the engine. The throttle valve can be opened or closed by a motor according to a detection value detected by the sensor (for example, see Japanese Patent Publication JP-A-2004-092640). In this publication, the engine control device is disposed on an outboard motor of a small boat, and includes an electronic control throttle valve for controlling the amount of intake air for the engine, a remote control lever for remotely operating an opening of the electronic control throttle valve, and throttle valve control means for controlling the electronic throttle valve according to operational states of the remote control lever.

This engine control device further includes throttle opening abnormality detecting means, and abnormal state intake air control means. When an abnormality occurs in the opening control for the electronic throttle valve and the throttle opening abnormality detecting means detects the abnormality, at least a minimum amount of intake air that is necessary to keep the engine running is supplied to the engine by the abnormal state intake air control means. Thus, the small boat can "limp-home" (return to port) even if an abnormality occurs in the opening control for the electronic control throttle valve.

SUMMARY OF THE INVENTION

An aspect of at least one of the embodiments disclosed herein includes the realization that, in the small boat described in the JP-A-2004-092640 publication, when the engine operates with the amount of air that is provided by the abnormal state intake air control means while the regular throttle opening control for the electronic control throttle valve is not available, the small boat can abruptly accelerate or the engine can stop. That is, if the engine operation is controlled by means of a regular fuel injection control or ignition timing control when such an abnormality occurs, generally, an engine speed becomes higher than an idle speed. Therefore, if the engine speed switches to the speed in the abnormal condition from a speed in a low speed range, for example an idle condition, it is likely that the intake air amount increases to accelerate the boat, or that the fuel injection amount cannot follow the increase of the intake air amount and the engine stops.

In the engine control device according to at least some of the embodiments disclosed herein, the ignition timing control by the ignition timing control device is switched from the preset regular ignition timing control to the limp-home ignition timing control, when, for example, an abnormality of the throttle valve opening is detected from a detection value of the operation amount detecting device or the throttle opening detecting device. In this regard, if the abnormality occurs while the throttle valve is positioned in a low opening range (closed side), the throttle valve pivots toward the open side, and the control by the ignition timing control device makes the ignition timing correspond to the intake air amount with the opening of the throttle valve in the mechanically neutral position. In this manner, the engine speed is adjusted to increase.

Therefore, if the engine control device is disposed on, for example, a water jet propulsion boat, the engine speed corresponds to speed sufficient to "limp-home". Also, if the abnormality of the throttle opening control occurs while the throttle valve is positioned in a high opening range (open side), the throttle valve pivots toward the closed side, and the control by the ignition timing control device makes the ignition timing correspond to the intake air amount with the opening of the throttle valve in the mechanically neutral position. In this manner, the engine speed is adjusted to decrease. Thus, the watercraft can return to port with a slow speed, i.e., under a proper running condition.

Thus, in accordance with an embodiment, an engine comprises a throttle valve configured to adjust an amount of air supplied to the engine and an operating member. An operation amount detecting device is configured to detect an operation amount of the operating member. A motor is configured to drive the throttle valve between open and closed positions according to a detection value detected by the operation amount detecting device. A throttle opening detecting device is configured to detect an opening of the throttle valve. A limp-home mechanism is configured to keep the opening of the throttle valve in a mechanically neutral position when an abnormality occurs in which a normal throttle opening control for the throttle valve is not available. An ignition timing control device is configured to switch an ignition timing control for the engine from a regular ignition timing control to a limp-home ignition timing control conducted according to an amount of intake air with the opening of the throttle valve in the mechanically neutral position when the opening of the throttle valve is in the mechanically neutral position due to occurrence of the abnormality. Additionally, an ignition timing control changing device is configured to change the ignition timing control stepwise over a predetermined time period, when the ignition timing control conducted by the ignition timing control device is switched from the regular ignition timing control to the limp-home ignition timing control.

In accordance with another embodiment, an engine comprises a throttle valve configured to adjust an amount of air supplied to the engine and an operating member. At least a pair of operation amount detecting devices are configured to detect an operation amount of the operating member. A motor is configured to move the throttle valve between open and closed positions according to a detection value detected by the operation amount detecting device. At least a pair of throttle opening detecting devices are configured to detect an opening of the throttle valve. A limp-home mechanism configured to maintain the opening of the throttle valve in a mechanically neutral position when an abnormality occurs in which a normal throttle opening control for the throttle valve is not available. An ignition timing control device is configured to switch an ignition timing control for the engine from a regular ignition timing control to a limp-home ignition timing control conducted according to an amount of intake air with the opening of the throttle valve in the mechanically neutral position when the opening of the throttle valve is in the mechanically neutral position due to occurrence of the abnormality. Additionally, limp-home ignition timing changing means are provided for changing a rotational speed of the engine, when the ignition timing control conducted by the ignition timing control device is switched to the limp-home ignition timing control due to occurrence of the abnormality resulting from a malfunction of any one of the pair of operation amount detecting devices or the pair of throttle opening devices, by changing the ignition timing according to a detection value detected by at least one of the pair of operation amount detecting devices not malfunctioning.

BRIEF DESCRIPTION OF THE DRAWINGS

These and other features and advantages of the inventions, features, aspects, and embodiments will become more apparent upon reading the following detailed description and with reference to the accompanying drawings of an embodiment that exemplifies the invention. The drawings comprise eight figures.

DETAILED DESCRIPTION OF THE PREFERRED EMBODIMENT

Figure 1:
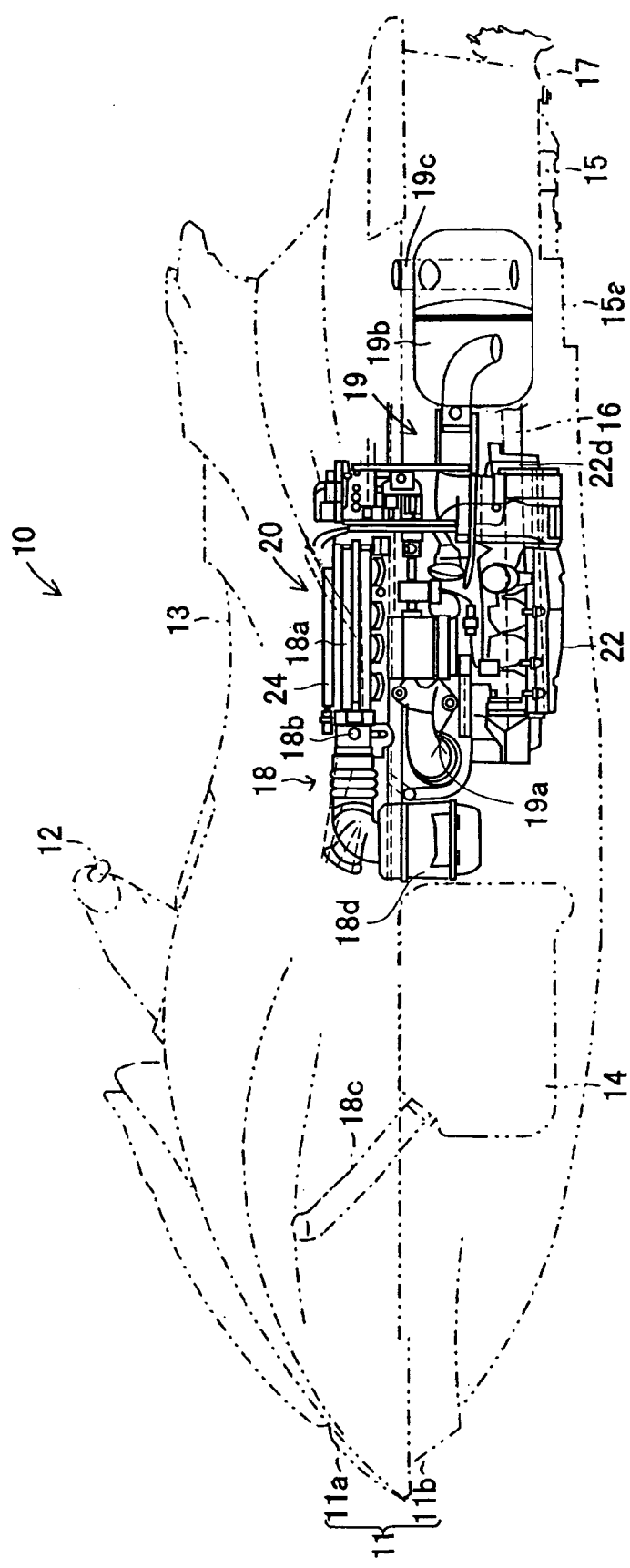
FIG. 1 is a side elevational view of a small watercraft with an engine control device according to an embodiment.

An embodiment is described below with reference to the drawings. FIG. 1 shows a personal water-jet propulsion watercraft 10 with an engine control device 20. The embodiments disclosed herein are described in the context of a personal watercraft because these embodiments have particular utility in this context. However, the embodiments and inventions herein can also be applied to other marine vessels, such as and small jet boats, as well as other vehicles.

With reference to FIG. 1, in the boat 10, a boat body 11 is formed of a deck 11a and a lower hull 11b. A steering handle 12 is provided in the upper part of the boat body 11 at a portion, forwardly of the center. A seat 13 is provided in the upper part of the boat body 11 at about the middle of the boat 10. The steering handle 12, also shown in FIG. 2, is mounted to the upper end of a steering shaft 12a provided in the boat body 11, for rotation about or with the steering shaft 12a.

Figure 2:
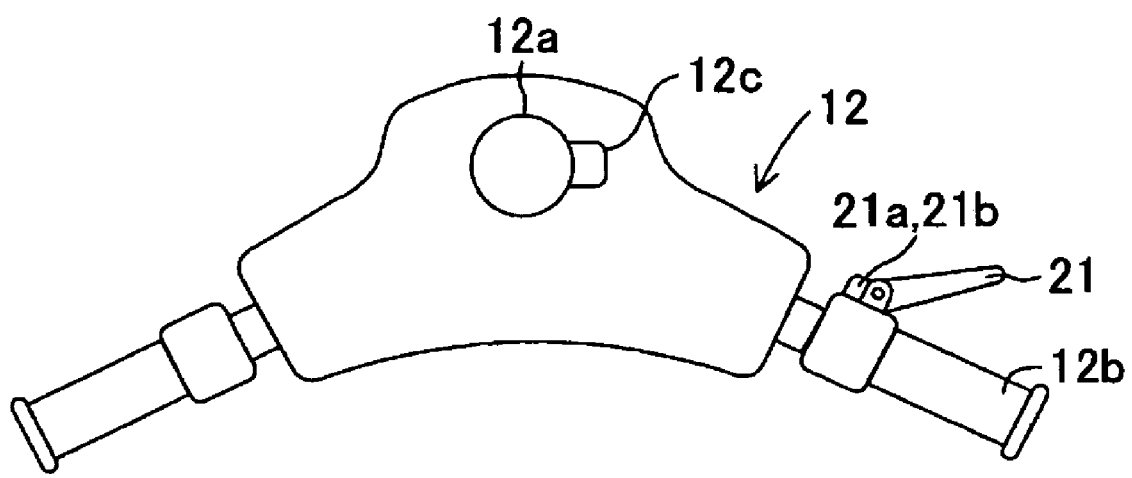
FIG. 2 is a plan view of a steering handle of the watercraft of FIG. 1.

With reference to FIG. 2, in the vicinity of a grip 12b on the right side (on the starboard side) of the steering handle 12 is provided a throttle lever 21 for rotation about its base-end side portions, although other configurations can also be used. The throttle lever 21 is movable toward the grip 12b through a driver's operation, with, for example, an operator's finger, although other configurations can also be used. When the lever 21 is not being depressed, the lever is held separated from the grip 12b, by a spring, for example. In the base section of the throttle lever 21 is provided an amount-of-operation sensor 21a for detecting the amount of operation (amount of rotation) of the throttle lever 21. The sensor 21a can be any type of sensor. One type of sensor that can be used is, for example, but without limitation, a rheostat configured to output a voltage indicative of the angular position of the lever 21a, however, other sensors can also be used.

The watercraft 10 can also include a steering angle sensor 12c configured to detect an angular displacement of the steering handle 12. For example, the steering angle sensor 12c can be mounted in the vicinity of the steering shaft 12a and configured to detecting the rotational angle of the steering shaft 12a (steering handle 12), and or the angular velocity of the steering handle. However, other sensors can also be used.

With reference to FIG. 1, in the bottom of the body 11 at the forward portion thereof is disposed a fuel tank 14 for storing fuel. In the bottom of the hull 11b at the middle portion thereof is disposed an engine 22.

To the engine 22 are connected an intake device 18 for sending a mixture of air and fuel supplied from the fuel tank 14, and an exhaust device 19 for discharging exhaust gas delivered from the engine 22, from the rear end of the body 11 to the outside.

Figure 3:
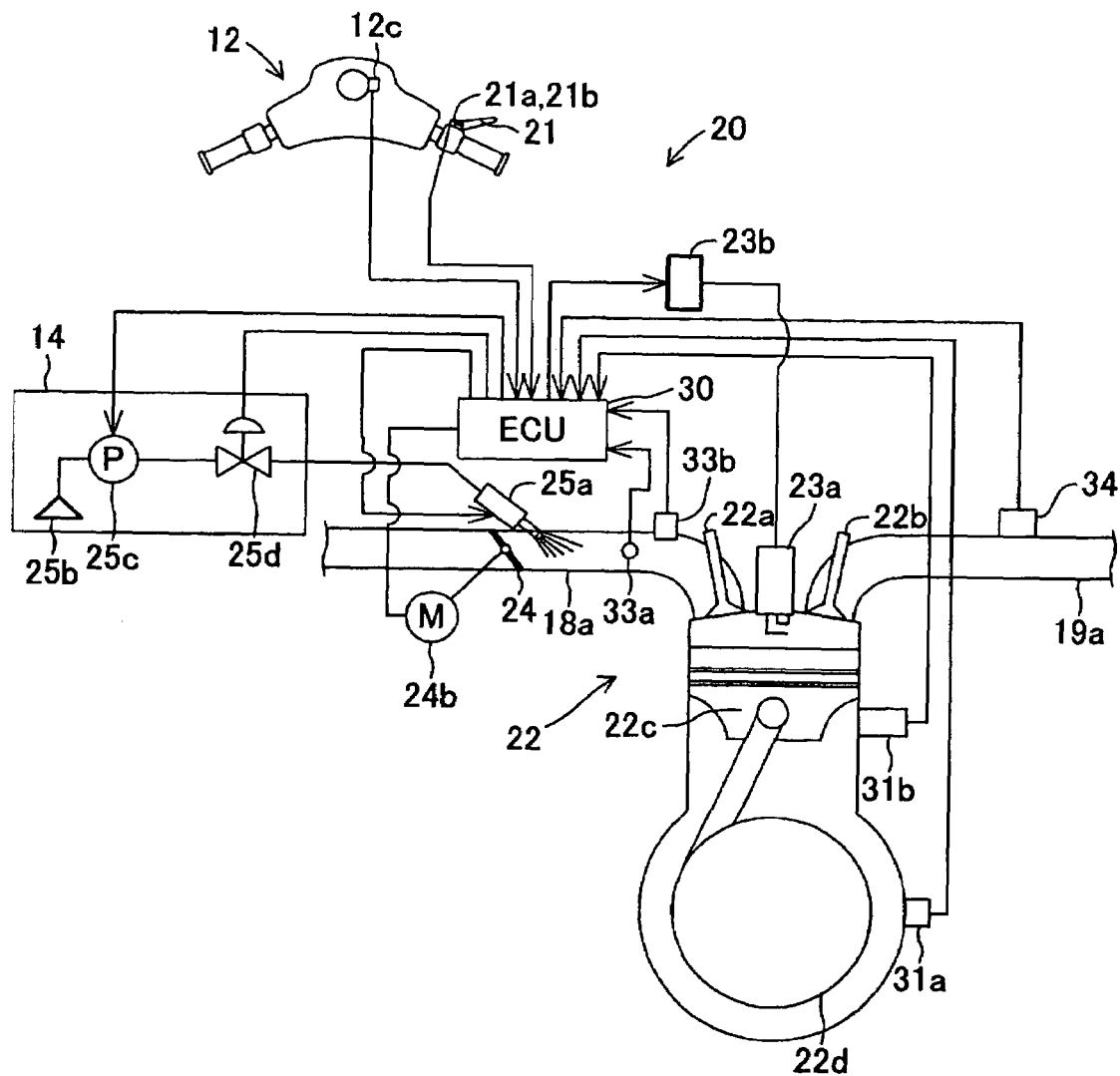
FIG. 3 is a schematic diagram of the engine control device.

In the illustrated embodiment, the engine 22 is a four-stroke, four-cylinder type. However, this is merely one type of engine that can be used with the present inventions. Engines having a different number of cylinders, other cylinder arrangements, various cylinder orientations (e.g., upright cylinder banks, V-type, and W-type), and operating on various combustion principles (e.g., four stroke, crankcase compression two-stroke, diesel, and rotary) are all practicable for use with the inventions disclosed herein. As shown in FIG. 3, the engine 22 draws in through an intake valve 22a, a mixture of fuel and air from the intake device 18 provided on the side of the intake valve 22a. Additionally, the engine 22 discharges exhaust gasses through an exhaust valve 22b, to the exhaust device 19 provided on the side of the exhaust valve 22b.

The fuel and air mixture supplied into the engine 22 through the intake valve 22a is ignited through activation of an ignition device. The ignition device can be any type of ignition device or system. In the illustrated embodiment, the ignition device comprises an ignition or "spark" plug 23a provided on the engine 22.

When the air/fuel mixture is ignited, the mixture combusts and thus causes a piston 22c provided in the engine 22 to make an up and down movement. The movement of the piston 22c causes a crankshaft 22d to rotate. The crankshaft 22d is connected to an impeller shaft 16 through a direct connection or through one or a plurality of additional shafts. As such, the rotational force of the engine 22 is transmitted to the impeller shaft 16 to rotate an impeller (not shown) that is connected to the impeller shaft 16.

The impeller is part of a propulsion device 15 disposed at the rear end of and generally along a longitudinal centerline of the body 11. The rotation of the impeller produces a propulsive force for the water-jet propulsion boat 10. That is, the propulsion device 15 is provided with a water induction port 15a open toward the bottom of the boat body 11. A water ejection port (not shown) propulsion device 15 is open at the stern. Water introduced from the water induction port 15a is jetted out from the water ejection port through rotation of the impeller to produce a propulsive force for the boat body 11.

A steering nozzle 17 is attached to the rear end of the propulsion device 15. The steering nozzle 17 is configured to deflect the water jet ejected from the propulsion device 15 so as to change a running direction of the watercraft 10 to the left and right by moving its rear portion to the left and right in response to the operation of the steering handle 12.

The intake device 18 can include an intake pipe 18a connected to the engine 22, a throttle body 18b connected to the upstream end of the intake pipe 18a, and the like. Air outside the boat body 11 is drawn through an intake air duct 18c and an intake box 18d. The flow of such air can be regulated by opening/closing of a throttle valve 24 provided in the throttle body 18b. As air flows through the intake pipe 18a, it is mixed with fuel. The fuel can be supplied from the fuel tank 14 through a fuel feed device made up of an injector 25a and the like. This type of fuel injection system is known as "port" fuel injection. Other types of fuel injection systems, such as, for example, but without limitation, direct fuel injection, can also be used.

The exhaust device 19 includes an exhaust pipe 19a that can comprises bent pipes connected to the engine 22. A tank-like water lock 19b can be connected to the rear end of the exhaust pipe 19a, so as to suppress water from flowing upstream through the exhaust system.

An exhaust pipe 19c can be connected to the rear of the water lock 19b. The exhaust pipe 19a can extend initially forwardly. In the illustrated engine, one exhaust pipe 19a is provided for each cylinder of the engine 22. These individual exhaust pipes 19a are grouped together on the starboard side of the engine 22, and extend around the front side of the engine 22 toward the port side. On the front or port side of the engine 22, the individual pipes 19a can be merged together to form a common exhaust passage. The common exhaust passage can extend further rearwardly from the read side of the engine 22. However, this is merely one exemplary configuration of the exhaust system. Other configurations can also be used.

The rear end of the common exhaust passage 19a is in communication with the front of the water lock 19b. The exhaust pipe 19c extends rearward from the rear top surface of the water lock 19b. The exhaust pipe 19c first extends upwardly from the rear top surface of the water lock 19b and then downwardly to the rear, the downstream end of which opens to an undersurface of the body 11, near the rear end. One such undersurface can be a side wall of a tunnel in which the propulsion device 15 is disposed. The exhaust device 19 discharges exhaust gas to the outside, with outside water or the like prevented from entering into the engine 22.

In the illustrated embodiment, the throttle valve 24 is formed in the shape of a disc, to the central portion (in its diametric direction) of which is fixed a rotational shaft 24a. The rotational shaft 24a is supported inside the throttle body 18b for rotation, to one end of which is connected a motor 24b. Therefore, the throttle valve 24 rotates in normal and reverse directions on the rotational shaft 24a in association with the rotation of the motor 24b, to open/close the intake air passage in the throttle body 18b.

Figure 4:
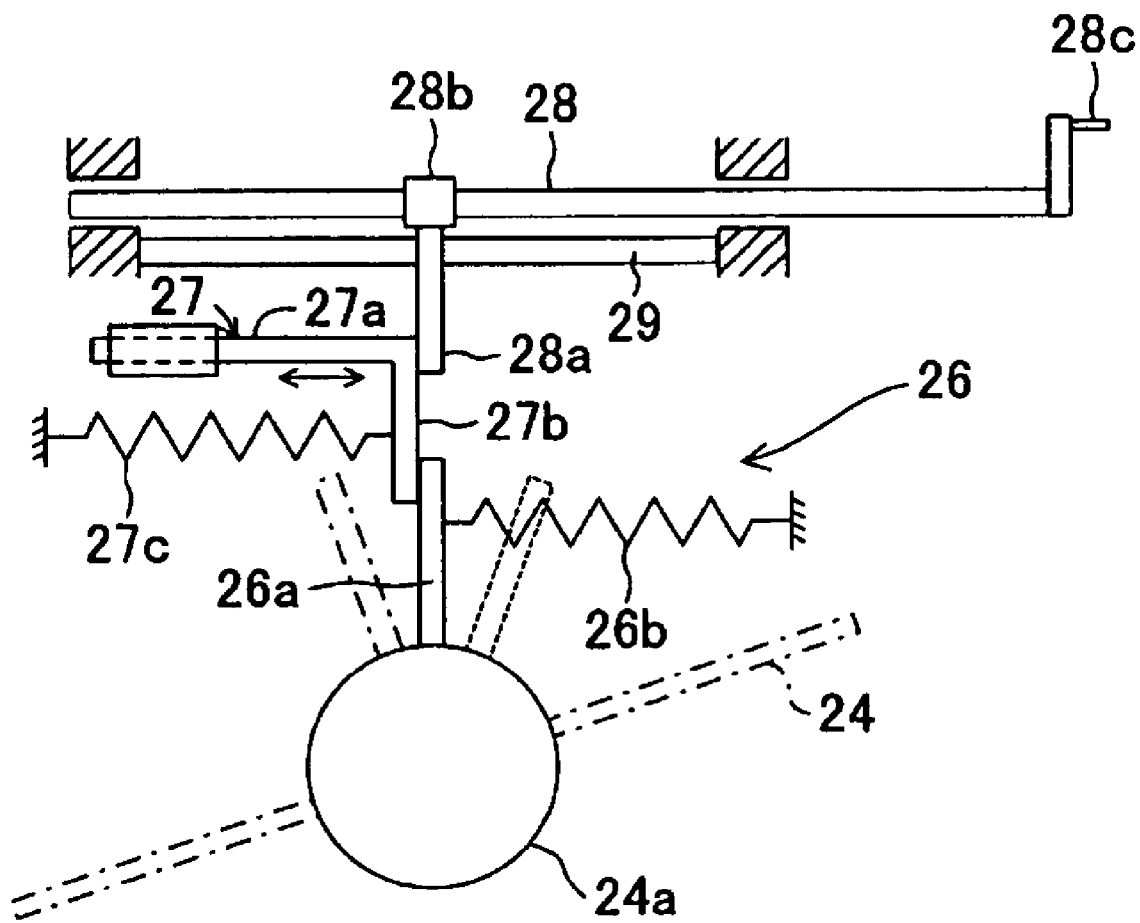
FIG. 4 is a schematic diagram of a limp home mechanism that can be used with the engine control device of FIG. 4.

With reference to FIG. 4, the watercraft 10 can also include a limp home mechanism 26. The limp home mechanism 26 can be configured to acts as a means of performing a limp home function when the motor 24b fails to adjust throttle opening to a desired amount. For example, but without limitation, the motor 24b might fail to properly adjust the throttle valve 24 due to an energization abnormality or the like due to breaking of wire of the motor 24b and the like.

That is, in the limp-home mechanism 26, an engaging piece 26a is formed at a predetermined portion in an outer surface of the pivot shaft 24a. The engaging piece 26a is coupled with a spring 26b that urges the throttle valve 24 in an open direction (counterclockwise direction in FIG. 4). Also, on a surface of the engaging piece 26a in its tip portion side that is opposite to the surface to which the spring 26b is coupled, an L-shaped slide portion 27, which is movable in a tangential direction (in a direction that is parallel to a direction in which the spring 26b expands or contracts) of the pivot shaft 24a under a condition that the slide portion 27 abuts on the engaging piece 26a, is disposed.

The sliding portion 27 can comprise a horizontal piece 27a and a vertical piece 27b. The vertical piece 27b is connected to a spring 27c for biasing the throttle valve 24 toward its closing direction (clockwise in FIG. 4). The spring constant of the spring 27a is set larger than that of the spring 26b. Therefore, the spring 27c biases the throttle valve 24 clockwise against the reaction force of the spring 26b.

Above the throttle valve 24 in FIG. 4, a screw shaft 28 is disposed parallel to the moving direction of the sliding portion 27. A bar-like engagement piece 28a is mounted to the screw shaft 28 through a nut 28b. The engagement piece 28a is connected to the nut 28b, and the nut 28b is fitted on the screw shaft 28 to be movable in the axial direction thereof. Therefore, contact of the forward end of the engagement piece 28a with the sliding portion 27 stops the sliding portion 27, so that the rotation of the throttle valve 24 in the clockwise direction can be restricted.

Under the screw shaft 28 and parallel to the screw shaft 28, is disposed a guide bar 29 for restricting the rotation of the engagement piece 28a. At one end of the screw shaft 28 is provided an operating handle 28c. Thus, rotational operation of the operating handle 28c allows the engagement piece 28a to move in the axial direction of the screw shaft 28, with its rotation prevented by the guide bar 29.

In the limp home mechanism 26 as described above, the opening of the throttle valve 24, when the motor 24b is not energized, is set to be an angle capable of securing the minimum amount of intake air required at the time of limp home. Adjustment of the throttle opening is performed through rotational operation of the operating handle 28c in this case.

The engine control device 20 according to this embodiment is provided, in addition to the foregoing devices, with various devices such as an electronic control unit 30 (hereinafter referred to as an ECU) and the like and various kinds of sensors. In the fuel tank 14, a filter 25b, a fuel pump 25c and a pressure control valve 25d are disposed. The pressure control valve 25d is connected to the injector 25a, controlling the pressure of fuel whose impurities are filtered and removed by the filter 25b and which is fed to the injector 25a through operation of the fuel pump 25c.

To the ignition plug 23a is connected an ignition coil 23b, which sends an electric current to the ignition plug 23a in synchronization with the ignition timing. Thus, the ignition plug 23a ignites fuel through discharging.

In the vicinity of the crankshaft 22d in the engine 22 is provided a rotational speed sensor 31a for detecting the rotational speed of the crankshaft 22d. In the body of the engine 22 is provided a temperature sensor 31b for detecting the temperature of the engine body. In the vicinity of the rotational shaft 24a of the throttle valve 24 is provided a throttle opening sensor 32 (see FIG. 5) for detecting the opening of the throttle valve 24.

In the intake pipe 18a are provided an intake air pressure sensor 33a for detecting the intake air pressure inside the intake pipe 18a and an intake air temperature sensor 33b for detecting the intake air temperature inside the intake pipe 18a. In the exhaust pipe 19a is provided an exhaust air-fuel ratio sensor 34 for detecting the air-fuel ratio in the exhaust pipe 19a.

Figure 5:
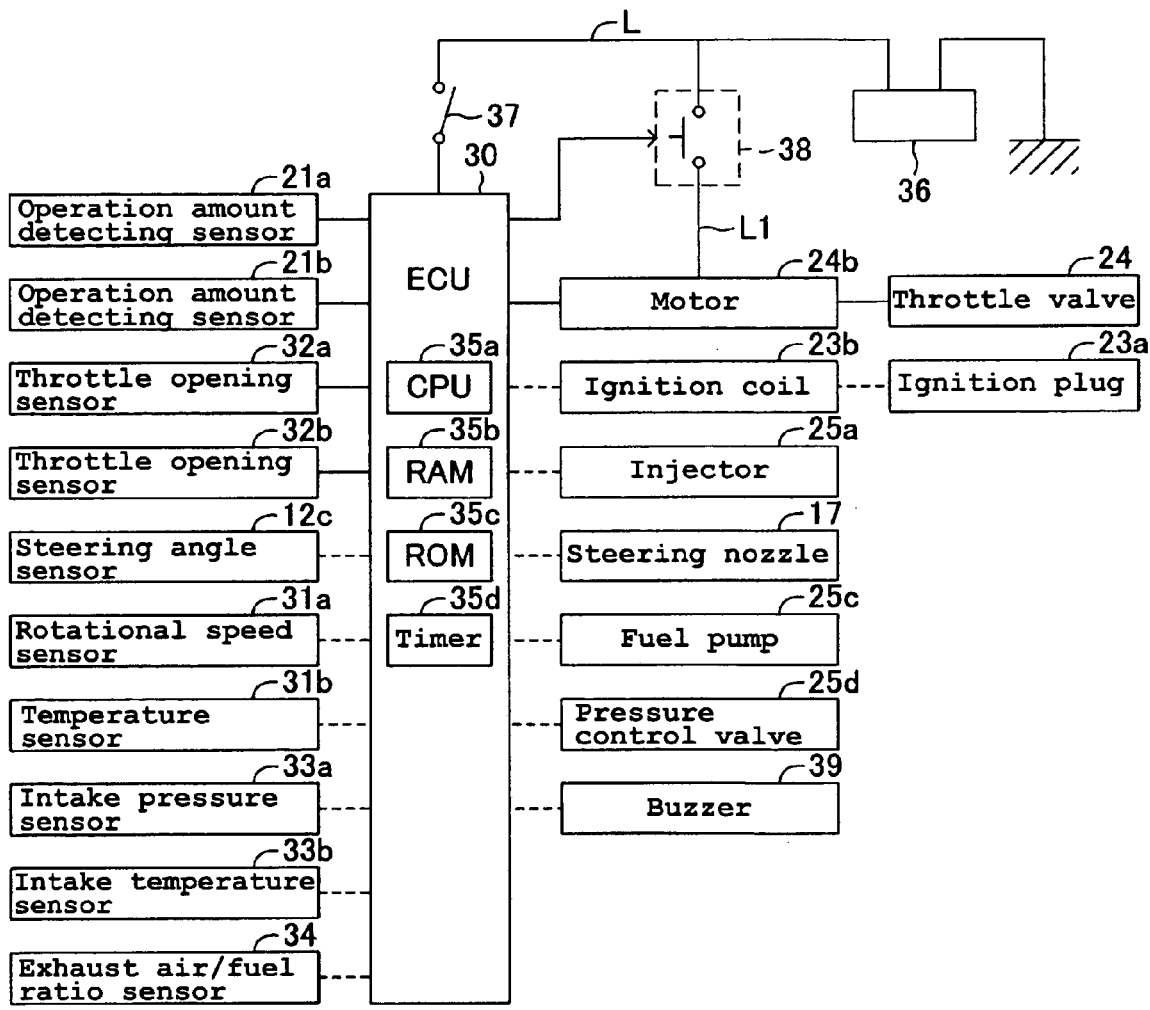
FIG. 5 is a block diagram of the engine control device.

The ECU 30 can include a CPU 35a, a RAM 35b, a ROM 35c, a timer 35d and various kinds of circuitry devices (not shown), as shown in FIG. 5. Detection signals can be input from an amount-of-operation sensor 21a which indicates the condition of operation of the throttle lever 21 and the rotational speed sensor 31a which indicates the rotating condition of the engine 22. The ECU 30 can be configured to process the detection signals from these sensors based on a control map stored in the ROM 35c, transfers control signals to the injector 25a, ignition coil 23b, motor 24b, fuel pump 25c, pressure control valve 25d and the like, for the control of fuel injection or ignition timing, as well as of opening of the throttle valve 24. That is, the ECU 30 functions as the mode judgment means, ignition timing control device and fuel injection control device according to one embodiment.

The ECU 30 is connected to a battery 36 through a power source line L having an ignition switch 37 therein. The ignition switch 37 is changed over between ON and OFF through driver's operation, and when it is set ON, power is supplied to the ECU 30. The battery 36 is connected to the motor 24b through the power source line L1, having a relay 38 therein. The relay 38 is changed over between ON and OFF based on the signal sent from the ECU 30, and when it is set OFF, power supply path (power source line Li) of the motor 24b is cut off, stopping energization of the motor 24b. Also, a buzzer 39 can be connected to the ECU 30 to generate warning sound when an abnormality occurs with the throttle opening control.

During operation, an operator can start the water-jet propulsion boat 10. If the driver sets a main switch (not shown) ON and also manipulates the ignition switch 37 to an ON position, then the watercraft 10 is brought into the condition for running; the engine 22 is running at least at idle speed. In this case, the relay 38 is set to be ON and the motor 24b is in the condition for operation. As the boat operator operates the steering handlebars 12 and the throttle lever 21 disposed on the grip 12b, the watercraft 10 runs in a direction and in a speed according to the respective operations.

Figure 6:
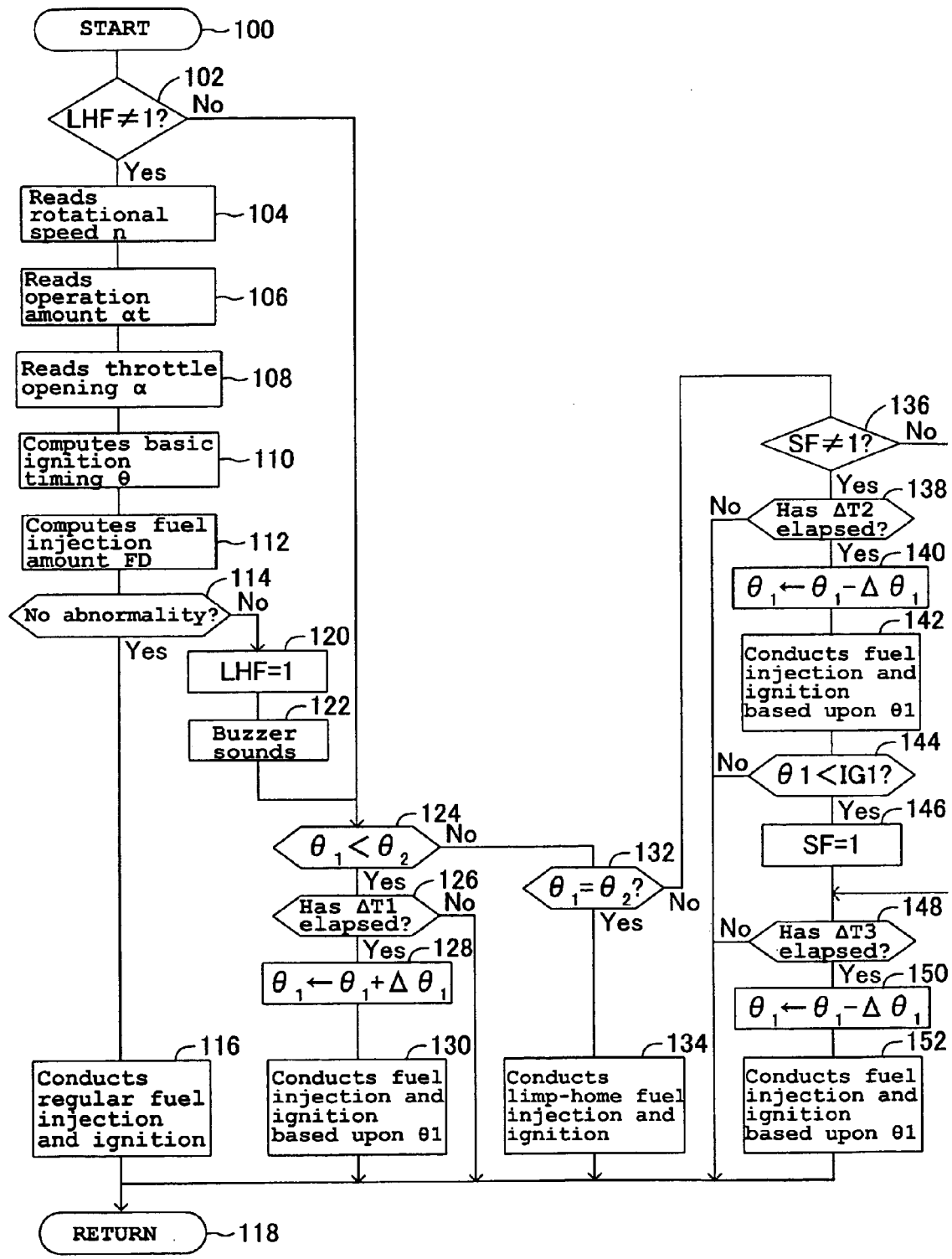
FIG. 6 is a flowchart illustrating a program that can be used in conjunction with the engine control device, or other engine control devices for providing a limp-home mode engine operation, in accordance with an embodiment.

Control of the engine 22 can be performed according to a program illustrated in flowchart form in FIG. 6. The program can optionally be repeated at given time intervals after the ignition switch 37 is set ON.

The program is started in Step 100. Then, the program proceeds to Step 102 and the CPU 35a determines whether or not the limp home flag LHF has been set to "1." The limp home flag LHF indicates that an abnormality has occurred related to the control of throttle valve 24. In some embodiments, an abnormality is indicated when the LHF flag is set to "1", an normal operation is indicated when the LHF flag is set to "0". The limp home flag LHF can optionally be reset to "0" when execution of the program is started. If in Step 102, it is determined that the LHF flag is "1", resulting in a "YES" determination, the program proceeds to Step 104.

In Step 104 the engine speed n detected by the rotational speed sensor 31a is read and then stored temporarily in the RAM 35b. Then, the program proceeds to Step 106.

In the Step 106, an operation amount αt of the throttle lever 21 (throttle opening command value) detected by the operation amount detecting sensors 21a, 21b is read and those values can be stored in the RAM 35b. Next, the program proceeds to a Step 108.

In the Step 108, the CPU 35a reads a throttle opening α detected by the throttle opening sensors 32a, 32b and those values can be stored in the RAM 35b. Then, the program proceeds to a Step 110.

Figure 7:
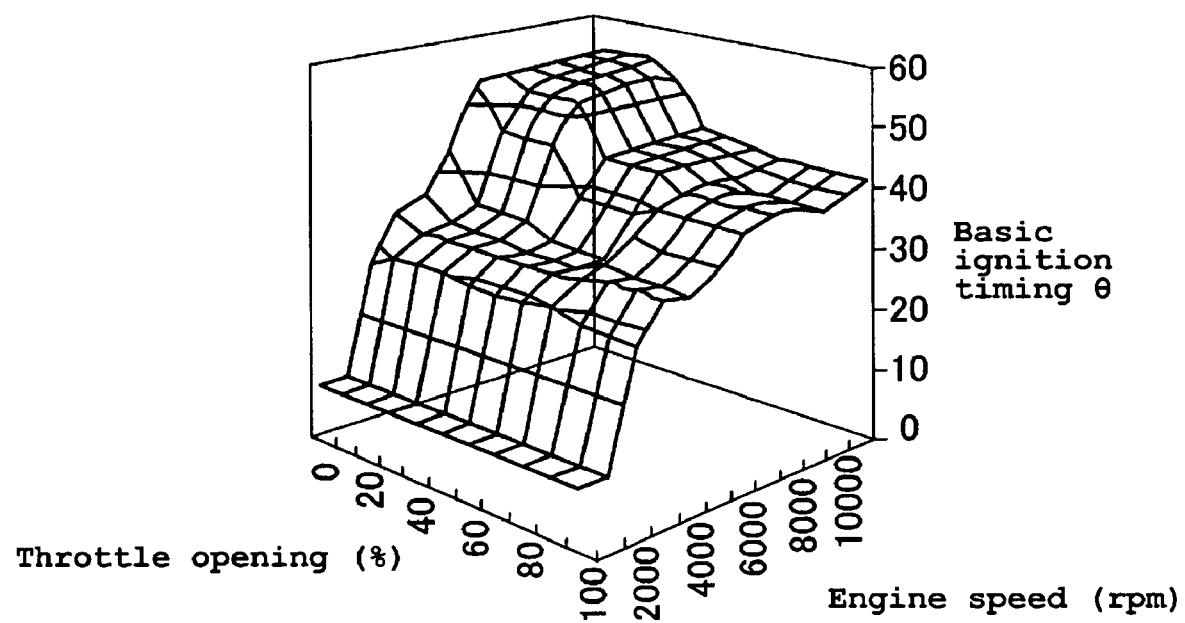
FIG. 7 is a graph illustrating an exemplary multi-dimensional basic ignition timing map that can be used in conjunction with the program of FIG. 6 and/or some embodiments of the engine control device of FIGS. 1–5.

At the Step 110, a basic ignition timing θ is computed. Regarding the basic ignition timing θ, for example, an exemplary map for computing a regular ignition timing is shown in FIG. 7. Such a map can be predetermined and stored in the ROM 35c. The basic ignition timing θ illustrated in FIG. 7 can be determined based upon values of an engine speed (rpm) and a throttle opening (%), in a manner well known in the art. That is, the map for computing the regular ignition timing is made based upon relationships between the basic ignition timing and the throttle opening both at a certain engine speed and relationships between the basic ignition timing and the engine speed at a certain throttle opening.

Figure 8:
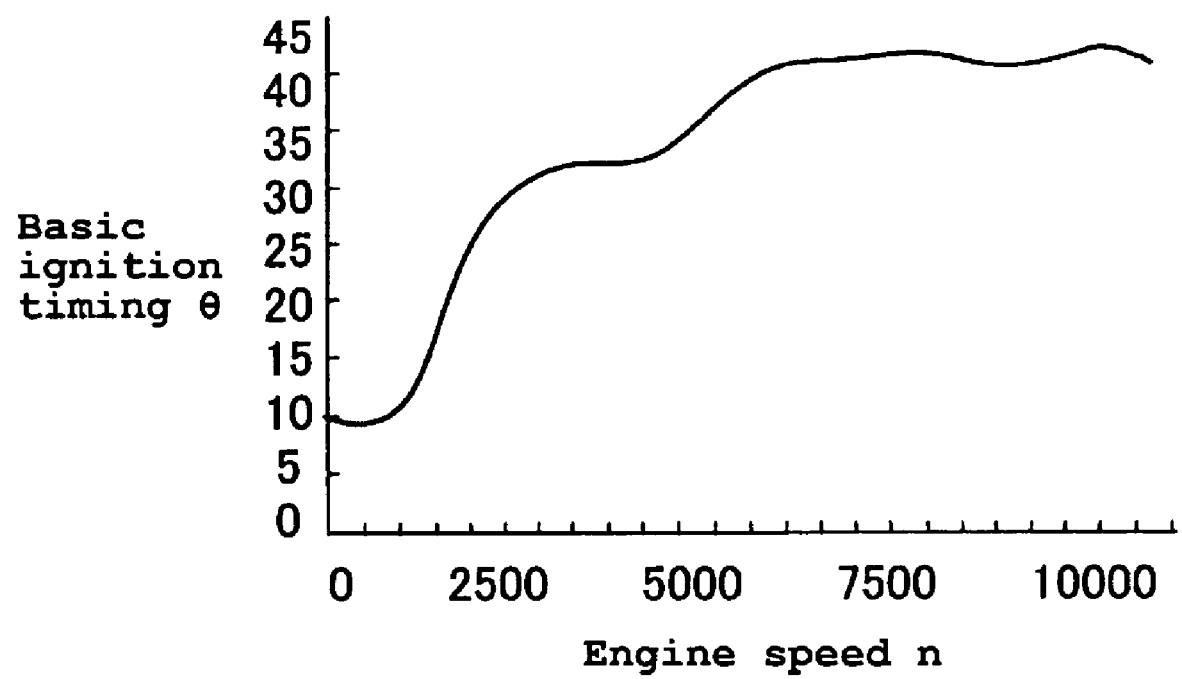
FIG. 8 is a graph illustrating an exemplary relationship between engine speed and basic ignition timing.

In this manner, a basic ignition timing θ can be identified for detected engine speeds and throttle openings. The basic ignition timing θ is computed from the engine speed n obtained in the process of the Step 104 and the throttle opening α obtained in the process of the Step 108. The computed value of the basic ignition timing θ can be stored in the RAM 35b. As used herein, the "basic ignition timing θ" is intended to mean the timing at which each ignition plug 23a ignites the mixture supplied to the engine 22, and is indicated by an angle before "0 degrees" which is defined as the top dead center (TDC) of the piston 22c. An exemplary but non-limiting example of the relationship between the basic ignition timing θ and engine speed n during normal acceleration is shown in FIG. 8.

The program the proceeds to a Step 112 to compute a fuel injection amount FD. Regarding the fuel injection amount FD, a map for computing a fuel injection amount (not shown) can be predetermined, in a manner well known in the art, and stored in the ROM 35c. The fuel injection amount FD can be based upon the map for computing the fuel injection amount. The fuel injection amount FD, as used herein, is intended to mean the injection amount of fuel that is supplied to the engine 22 from each injector 25a. The map for computing the fuel injection amount can be prepared as a three or more dimensional map that defines relationships among the engine speed, the throttle opening, and the fuel injection amount.

Thus, a fuel injection amount FD that can set an optimum engine speed can be computed from the engine speed n obtained in the process of the Step 104 and the throttle opening α obtained in the process of the Step 108. The computed value of the fuel injection amount FD can also be stored in the RAM 35b. Also, on this occasion, although not depicted in FIG. 6, a computation of fuel injection timing can be conducted together with the computation of the fuel injection amount FD.

Next, the program proceeds to a Step 114, where the CPU 35a determines whether or not any abnormality has occurred during the throttle opening control. At this Step, a determination can be made as to whether or not the normal throttle opening control for the throttle valve 24 was conducted. The abnormality determination can be made by determining whether or not the throttle opening control is normally conducted due to occurrence of any disconnection, malfunction or the like in respective devices connected to the ECU 30 in solid lines in FIG. 5, such as the operation amount detecting sensors 21a, 21b.

At this Step, for example, but without limitation, the absolute value of a value that is obtained by subtracting the operation amount at of the throttle lever stored in the process of the Step 106 from the throttle opening α stored in the process of the Step 108 is computed as a change amount. The determination can be made based on whether or not the change amount is equal to or greater than a preset abnormality determination threshold value. In this situation, normally, the detection value of the operation amount detecting sensor 21a and the detection value of the throttle opening sensor 32a are compared with each other, while the detection value of the operation amount detecting sensor 21b and the detection value of the throttle opening sensor 32b are compared with each other, to make the determination from both change amounts. Alternatively, the abnormality determination can be made with different combinations of the sensors which are compared, or by changing the magnitudes of electric currents which flow both the sensors.

If the change amount is equal to or less than the abnormality determination threshold value, it is determined that an abnormality has not occurred. Here, assuming that no abnormality has occurred, "YES" is the result of the determination of Step 114 and the program proceeds to a Step 116.

At the Step 116, the injector 25a injects the fuel based upon the fuel injection amount FD and the fuel injection timing determined in the process of the Step 112. Additionally, a process to control the ignition timing of the ignition plug 23a is performed based upon the basic ignition timing θ determined in the process of the Step 110.

In this manner, the watercraft 10 runs based upon the engine speed according to the operation amount of the throttle lever 21. Also, an operation angle of the steering handlebars 12 is detected by the steering angle sensor 12c, and the ECU 30 controls the steering nozzle 17 in accordance with the detection value. Thus, the watercraft 10 runs in a direction according to the operation angle of the steering handlebars 12.

Then, the program proceeds to a Step 118 and temporarily ends and/or returns. As the program is again started, it proceeds from the Step 100 to the Step 102. At the Step 102, it is again determined whether or not the limp-home flag LHF is "1" is raised. Because the limp-home flag LHF is still set to "0," "YES" is the result of the determination at the Step 102, and the program proceeds to the Step 104. The same determinations noted above are again made in the Steps 104–112 to renew the obtained values of the engine speed n, the operation amount at of the throttle lever 21 and the throttle opening α and to compute a basic ignition timing θ, a fuel injection amount FD and a fuel injection timing corresponding to the values. Those renewed values can be stored in the RAM 35b.

Next, the program proceeds to the Step 114 to determine whether or not an abnormality has occurred on the throttle opening control. At this Step, if "YES" is the result because of no abnormality has been detected, the program proceeds to the Step 116 and the fuel injection and the ignition are made based upon the respective values computed in the processes of the Steps 104–112 conducted immediately before this Step. Then, the program proceeds to the Step 118 to end, and again the program is started from the Step 100. Then, the above-described processes are repeatedly conducted until the change amount exceeds the abnormality determination threshold value and "NO" result is determined at the Step 114. Then, during the process, the engine control device 20 conducts the regular ignition timing control and the regular fuel injection control.

When "NO" is the result of the Step 114 because an abnormality has occurred in the throttle opening control, the program proceeds to a Step 120. At the Step 120, a process in which the limp-home flag LHF is set to "1" is conducted. In this manner, a malfunction is deemed to have occurred. Also, on that occasion, the ECU 30 controls the relay 38 to the OFF state to bring the motor 24 to an inoperable condition. In this manner, the opening of the throttle valve 24 becomes an opening that is set by the limp-home mechanism 26.

Next, the program proceeds to a Step 122 to conduct a process in which the buzzer 39 is operated to generate alarm sound, however, other techniques can be used to notify the operator of the alarm, such as flashing lights, other sounds, etc. In this manner, the boat operator can find that an abnormality has occurred on the throttle opening control. Then, after the buzzer 39 generates the sound, the program proceeds to a Step 124, where a determination is made as to whether or not a basic ignition timing θ1 obtained immediately before is less than a limp-home ignition timing θ2.

This limp-home ignition timing θ2 is set as a suitable ignition timing for an opening of the throttle valve 24 according to the setting of the limp-home mechanism 26. Regarding this limp-home ignition timing θ2, a map for computing the limp-home ignition timing (not shown) is previously made and is stored in the ROM 35c. The limp-home ignition timing θ2 is determined based upon the detection values of the operation amount detecting sensors

21a, 21b in the map for computing the limp-home ignition timing. Also, the limp-home ignition timing θ2 is changeable by moving the engaging piece 28a of FIG. 4.

Figure 9:
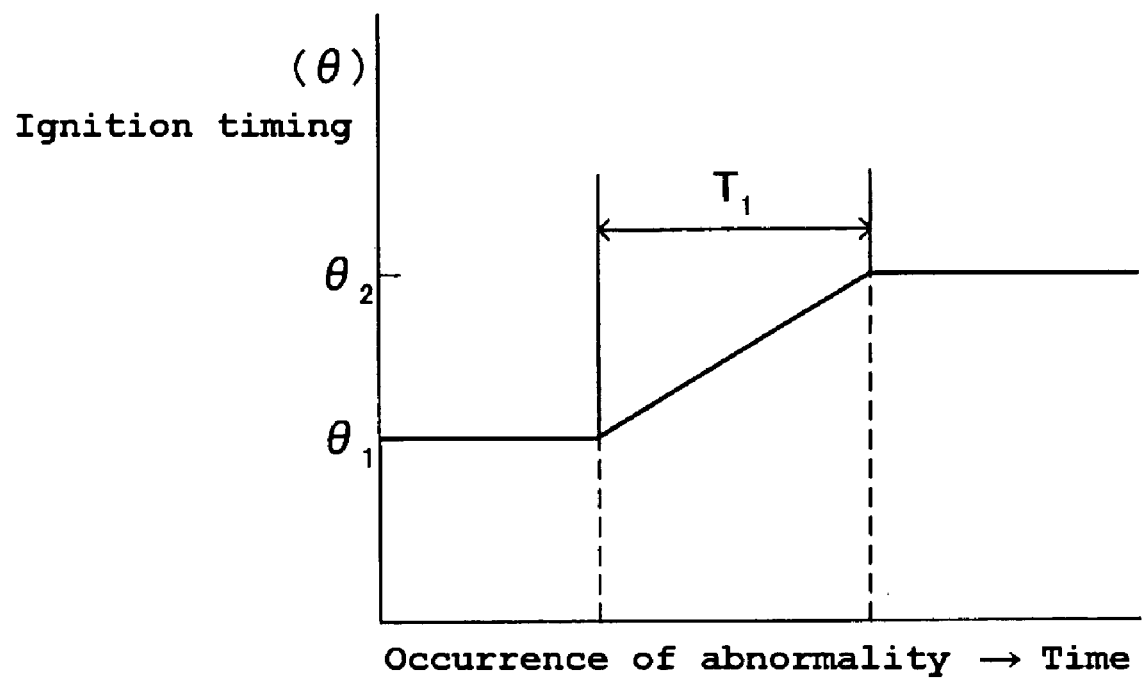
FIG. 9 is a graph showing an exemplary response of some embodiments of the present engine control device during switching from a basic ignition timing control to a limp-home ignition timing control when the basic ignition timing is less than the limp-home ignition timing.

On this occasion, if the basic ignition timing θ1 is less than the limp-home ignition timing θ2, then "YES" is the result of the determination at the Step 124 and the program proceeds to a Step 126 to determine whether or not a time ΔT1 has elapsed. The time ΔT1 can be a set period of time for conducting an adjustment process when an abnormality has occurred. For example, an amount of time that is sufficient to change the ignition timing control from the regular ignition timing control to the limp-home ignition timing control can be set or predetermined as T1. In this program, as shown in FIG. 9, the transfer from the basic ignition timing θ1 to the limp-home ignition timing θ2 is set to be gradually conducted over the time T1.

If the time ΔT1 has not elapsed, then "NO" is the result of the determination of the Step 126 and the program proceeds to the Step 118 and temporarily ends and/or returns. Then, the program can again be started from the Step 100. At the Step 102, a determination is made as to whether or not the limp-home flag LHF is "1." Because the limp-home flag is set to "1" at this Step, "NO" is the result of this determination and the program proceeds to the Step 124.

At the Step 124, again, a determination as to whether or not the basic ignition timing θ1 is less than the limp-home ignition timing θ2. Because the basic ignition timing θ1 is equal to the value in the previous program process, "YES" is the result of this determination. The program then proceeds to the Step 126 to determine whether or not the time ΔT1 has elapsed. If the time ΔT1 has not elapsed, then "NO" is the result at the Step 126 and the program then proceeds to the Step 118 to end and repeat the processes at the above-described Steps 100, 102, 124, 126.

If, in Step 126, the time ΔT1 has elapsed, then "YES" is the result of Step 126 and the program proceeds to a Step 128 to conduct a process in which the basic ignition timing θ1 is advanced by an adjustment value Δθ1 (adjusted to a timing that is before the top dead center). Then, a value obtained by adding the adjustment value Δθ1 to the basic ignition timing θ1 obtained immediately before this Step is established as a renewed basic ignition timing θ1. The program then proceeds to a Step 130.

The adjustment value Δθ1 is defined such that a relationship is established in which, when the product of the time ΔT1 and a certain integer m is equal to the time T1, a difference value obtained by subtracting the basic ignition timing θ1 before the renewal from the limp-home ignition timing θ2 is equal to the product of the adjustment value Δθ1 and the integer m.

That is, the adjustment value Δθ1 is determined such that, when processes in which the adjustment value Δθ1 is added to the basic ignition timing θ1 are repeated m times, the basic ignition timing θ1 that has been renewed m times is equal to the limp-home ignition timing θ2. As such, the ignition timing will be step-wise adjusted from the initial value of θ1 to the limp-home ignition timing θ2.

At the Step 130, the fuel injection and the ignition are made based upon the renewed basic ignition timing θ1. On this occasion, the fuel injection is conducted based upon the values of the fuel injection amount and the fuel injection timing immediately before the occurrence of the abnormality. Also, regarding the fuel injection, an adjustment can be made in the same manner as the basic ignition timing θ1 and the fuel injection can be conducted based upon the adjusted value.

Then, after the fuel injection and the ignition adjustments are complete, the program proceeds to the Step 118 to end and/or repeat. The program can again be started from the Step 100, and the process in which the basic ignition timing θ1 is advanced by the adjustment value Δθ1 to renew itself is conducted until the renewed basic ignition timing θ1 becomes equal to the limp-home ignition timing θ2 and "NO" is the result of the Step 124. At the Step 130, on all such occasions, the fuel injection and the ignition are made based upon the renewed basic ignition timing θ1.

When the basic ignition timing θ1 becomes equal to the limp-home ignition timing θ2 and "NO" is the result of the Step 124, the program proceeds to a Step 132. At the Step 132, whether or not the basic ignition timing θ1 obtained immediately before this step is equal to the limp-home ignition timing θ2 is determined. Here, because the basic ignition timing θ1 is equal to the limp-home ignition timing θ2, "YES" is the result and the program proceeds to a Step 134.

At the Step 134, the processes are conducted in which the injector 25a injects the fuel based upon the preset values of the fuel injection amount and the fuel injection timing, and also in which the ignition timing of the ignition plug 23a is controlled based upon the value of the limp-home ignition timing θ2, as processes for limp-home occasions. Then, after the fuel injection and the ignition are completed, the program proceeds to the Step 118 to end and/or repeat. Afterwards, the processes of the Steps 100, 102, 124, 132, 134, 118 can be repeated.

Also, if "NO" is the result of the Step 124 because the basic ignition timing θ1 obtained immediately before the limp-home flag LHF is set to "1" at the Step 120 is greater than the limp-home ignition timing θ2, and "NO" is the result of the Step 132, the program proceeds to a Step 136.

At the Step 136, a determination is made as to whether or not a period change flag SF is set to "1." The period change flag SF indicates that the basic ignition timing θ1 is equal to or less than a fixed value IG1 which can be a predetermined value, when the flag SF is set to "1". When the flag SF is set to "0", it indicates that the basic ignition timing θ1 is equal to or greater than the fixed value IG1. This period change flag SF is set to "0" in the initial stage.

Figure 10:
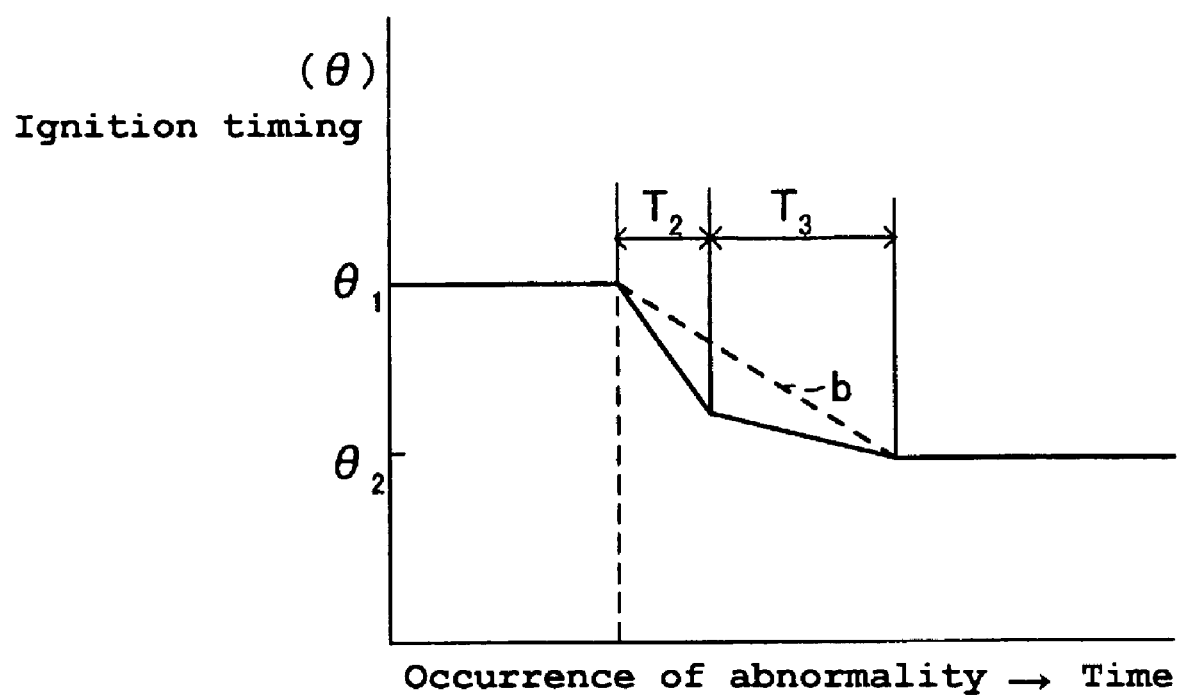
FIG. 10 is a graph showing an exemplary response of some embodiments of the present engine control device during switching from a basic ignition timing control to the limp-home ignition timing control when the basic ignition timing is more than the limp-home ignition timing.

Accordingly, at the Step 136, "YES" is the result and the program proceeds to a Step 138. At the Step 138, a determination is made as to whether or not a time ΔT2 has elapsed. In this regard, an amount of time that is sufficient to switch the ignition timing control from the regular ignition timing control to the limp-home ignition timing control when an abnormality has occurred on the throttle opening is defined as a total time of a time T2 and a time T3 as shown in FIG. 10. The time T3 can be longer than the time T2. The time ΔT2 is set as a period for conducting an adjustment process within the range of the time T2 in the initial stage. The initial stage of the transition from the basic ignition timing θ1 to the limp-home ignition timing θ2 is set to be conducted within the short time T2. Also, the basic ignition timing θ1 at the time when the time T2 elapses from the occurrence of the abnormality is the fixed value IG1.

In this regard, if the time ΔT2 has not elapsed and "NO" is the result of the Step 138, the program proceeds to the Step 118 to temporarily end and/or return. Then, the program is again started from the Step 100. Because the limp-home flag LHF is set to "1," "NO" is the result of the Step 102 and the program proceeds to the Step 124. Afterwards, the processes of the Steps 132, 136 are conducted, and then the program proceeds to the Step 138 to conduct again the determination as to whether or not the time ΔT2 has elapsed.

The processes of the Steps 100, 102, 124, 132, 136, 138 are repeated until the time ΔT2 elapses and "YES" is determined at the Step 138. When the time ΔT2 has elapsed and "YES" is determined at the Step 138, the program proceeds to a Step 140 to conduct a process in which the basic ignition timing θ1 is retarded by an adjustment value −Δθ1 (process for the basic ignition timing θ1 to approach the dead top center). Then, a value obtained by adding the adjustment value −Δθ1 to the basic ignition timing θ1 obtained immediately before is established as a renewed basic ignition timing θ1, and the program proceeds to a Step 142.

At the Step 142, the fuel injection and the ignition are made based upon the basic ignition timing θ1 obtained immediately before. On this occasion, the fuel injection can be based upon the fuel injection amount and the fuel injection timing both obtained immediately before the occurrence of the abnormality, or may be made based upon an adjustment value which can be computed, in the same manner as in the process of the Step 130. Next, the program proceeds to a Step 144.

At Step 144, a determination is made as to whether or not the basic ignition timing θ1 obtained immediately before is less than the fixed value IG1. If the basic ignition timing θ1 is equal to or greater than the fixed value IG1, then "NO" is the result of the determination at the Step 144 and the program proceeds to the Step 118 to temporarily end, and is again started from the Step 100. Then, the processes of the Steps 100, 102, 124, 132, 136–144, 118 are repeated until the basic ignition timing θ1 becomes less than the fixed value IG1.

During the processes, the basic ignition timing θ1 is renewed and gradually approaches the fixed value IG1. When the time T2 elapses, the basic ignition timing θ1 becomes less than the fixed value IG1.

When the basic ignition timing θ1 becomes less than the fixed value IG1 and "YES" is the result of the determination at the Step 144, the program proceeds to a Step 146, where a process in which the period change flag SF is set to "1" is conducted. Then, the program proceeds to a Step 148.

At the Step 148, a determination is made as to whether or not a time ΔT3 has elapsed or not. The time ΔT3 is set as a period for conducting an adjustment process within the range of the time T3 shown in FIG. 10. The time ΔT3 is set such that, after the initial stage of the transition from the basic ignition timing θ1 to the limp-home ignition timing θ2 completes, the switching from the normal ignition timing control to the limp-home ignition timing control is gradually conducted for the longer time T3.

In this regard, if the time ΔT3 has not elapsed, "NO" is the result of this determination and the program proceeds to the Step 118 to temporarily end and/or return. Then, the program is again started from the Step 100 and proceeds to the Step 136 after the processes of the Steps 102, 124, 132 are conducted. Because the period change flag SF has been set to "1" during the last execution of the program, "NO" is again the result of the determination at the Step 136 and thus the program proceeds to the Step 148 to make again the determination as to whether or not the time ΔT3 has elapsed.

The processes of the Steps 100, 102, 124, 132, 136, 148 are repeated until the time ΔT3 elapses and "YES" is the result at the Step 148. When the time ΔT3 has elapsed, the program then proceeds to a Step 150 to conduct a process in which the basic ignition timing θ1 is retarded by the adjustment value −Δθ1 . Then, a value obtained by adding the adjustment value −Δθ1 to the basic ignition timing θ1 obtained immediately before is established as a renewed basic ignition timing θ1, and the program proceeds to a Step 152.

At the Step 152, the fuel injection and the ignition are made based upon the basic ignition timing θ1 obtained immediately before, in the same manner as in the process of the Step 142. Next, the program proceeds to the Step 118 to end and/or return.

Then, at the Steps 148, 150, the process in which the basic ignition timing θ1 is retarded by the adjustment value −Δθ1 to be renewed is conducted until the basic ignition timing θ1 becomes equal to the limp-home ignition timing θ2 and "YES" is determined at the Step 132. Then, at the Step 152, the fuel injection and the ignition are made based upon the basic ignition timing θ1 obtained immediately before, in the same manner as in the process of the Step 142. During the process, the basic ignition timing θ1 gradually approaches the limp-home ignition timing θ2.

When the basic ignition timing θ becomes equal to the limp-home ignition timing θ2 and thus "YES" is the result of the Step 132, the program proceeds to the Step 134. At the Step 134, the processes are conducted in which the injector 25*a* injects the fuel based upon the preset values of the fuel injection amount and the fuel injection timing, and also in which the ignition timing of the ignition plug 23*a* is controlled based upon the value of the limp-home ignition timing θ2, as processes for limp-home operation. Then, the program proceeds to the Step 118 to end and/or return. Afterwards, the processes of the Steps 100, 102, 124, 132, 134, 118 are repeated. During these processes, the limp-home ignition timing control continues.

As such, the watercraft 10 can return to port with a suitable speed using the engine control according to the limp-home ignition timing control, even if an abnormality occurs on the throttle opening control.

Figure 11:
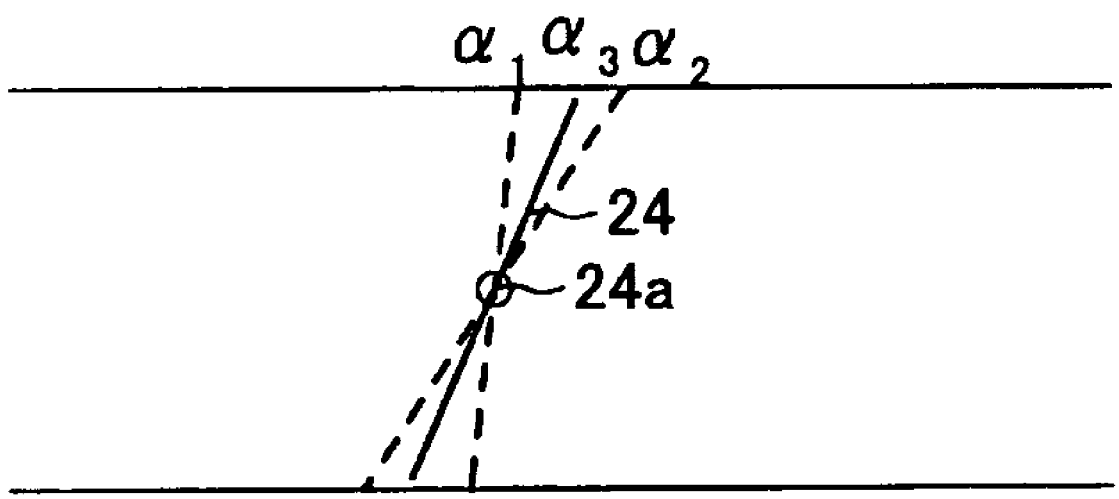
FIG. 11 is a schematic diagram illustrating exemplary positions of a throttle valve when an abnormality occurs.
Figure 12:
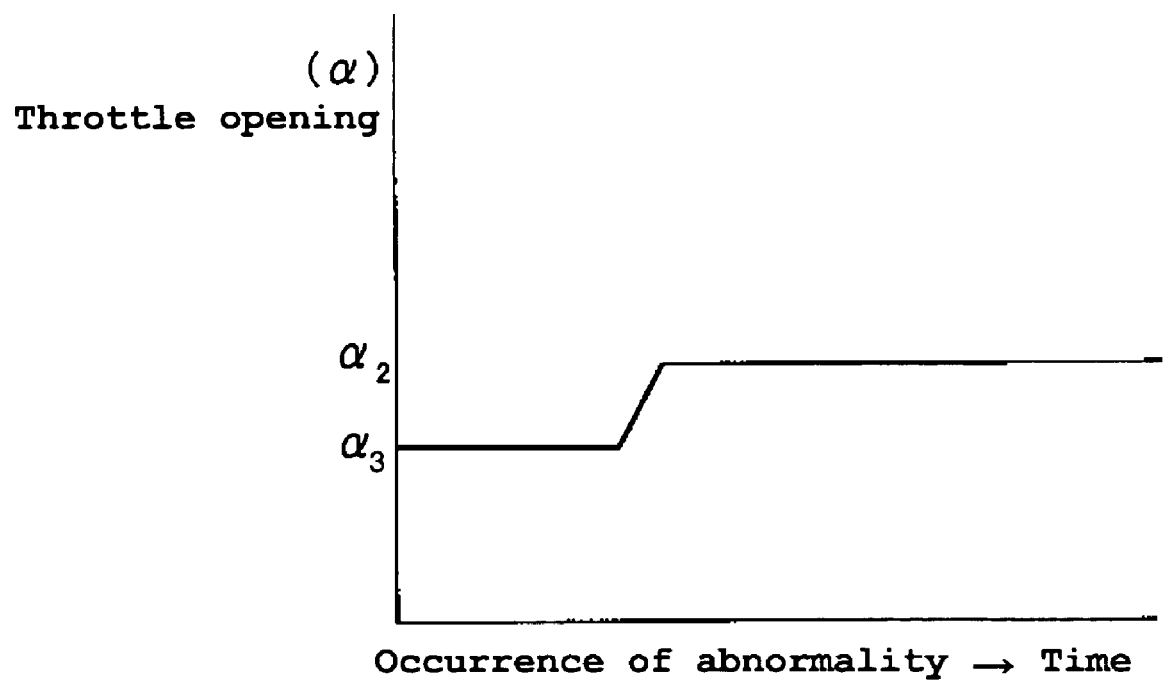
FIG. 12 is a graph showing exemplary fluctuations in an intake air amount when the throttle valve is pivoted to its open side.

FIG. 11 illustrates an exemplary condition of the throttle valve immediately before the switching from the regular ignition timing control to the limp-home ignition timing control. In FIG. 11, the ISC opening is a value that fluctuates between "α1" and "α2," and the throttle opening while the throttle valve 24 is placed at the set position of the limp-home mechanism 26 is determined as a mechanically neutral position α2.

The throttle opening of the throttle valve 24 when the abnormality occurs is indicated by "α3." Also, the ISC opening indicates a range in which the throttle valve 24 can pivotally move when the engine 22 is under the idle condition. The throttle valve 24 pivots in the range of the ISC opening to adjust the intake air amount such that a preset target rotational speed is obtained even when the load or the combustion state of the engine changes. Also, the determination as to whether or not the engine 22 is under the idle condition is made based upon the detection values of the operation amount detecting sensors 21*a*, 21*b*.

Figure 13:
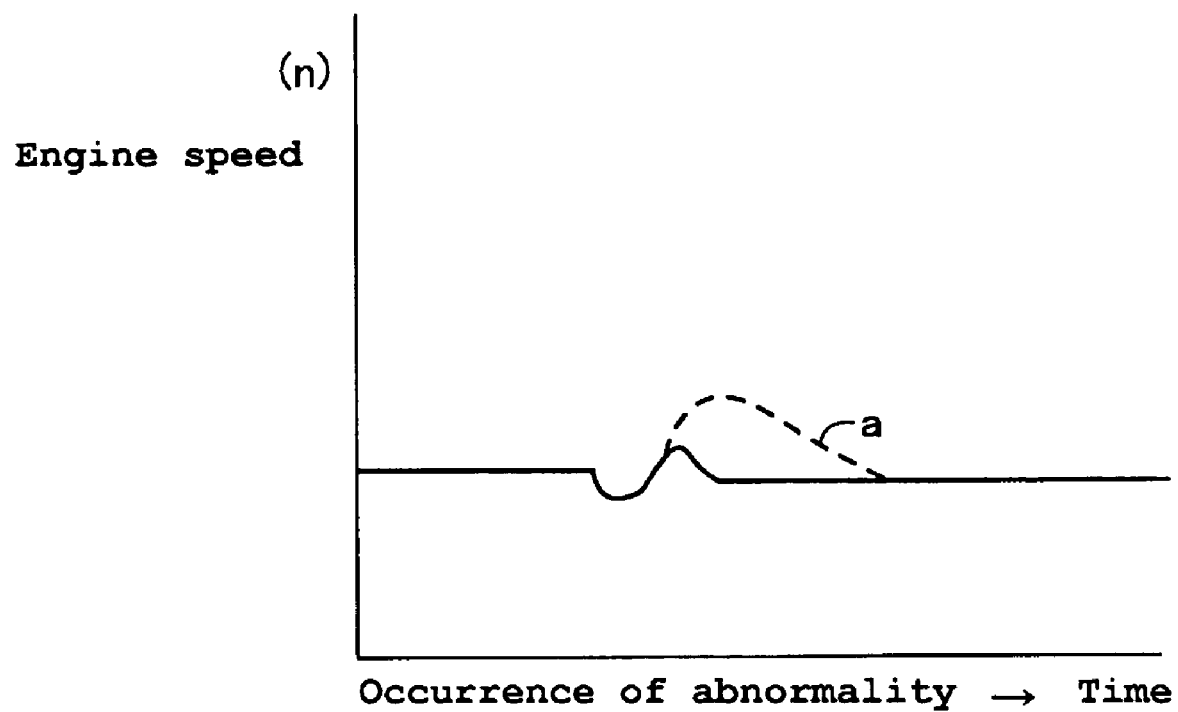
FIG. 13 is a graph showing exemplary fluctuations in the engine speed when the throttle valve is pivoted to its open side.

When an abnormality occurs while the throttle opening α of the throttle valve 24 is "α3" as shown in FIG. 11, the throttle valve 24 moves toward the mechanically neutral position α2 to make the opening larger. Thus, the throttle opening α becomes larger from the time of the occurrence of the abnormality. Because, in this state, the fuel injection amount is temporarily insufficient relative to the intake air amount, the engine speed n can temporarily decrease and then rise with the increase of the intake air amount and the fuel injection amount, as shown in FIG. 13.

Then, after the preset time elapses, the engine speed n decreases to become a fixed value according to the intake air amount and the fuel injection amount. As thus described, because the switching from the regular ignition timing control to the limp-home ignition timing control is gradually made in accordance with the present embodiment, abrupt fluctuations in the engine speed n are avoided to prevent occurrence of the engine stop or the like. The curved line given by the broken line a of FIG. 13 denotes the engine speed n in the situation that the switching from the regular ignition timing control to the limp-home ignition timing control is conducted without setting different periods, or with a constant period as given by the broken line b of FIG. 10. From the above, it is understandable that the abrupt fluctuations in the engine speed n is further avoided to prevent the occurrence of the engine stop by changing Stepwise from the regular ignition timing control to the limp-home ignition timing control with the different periods.

Figure 14:
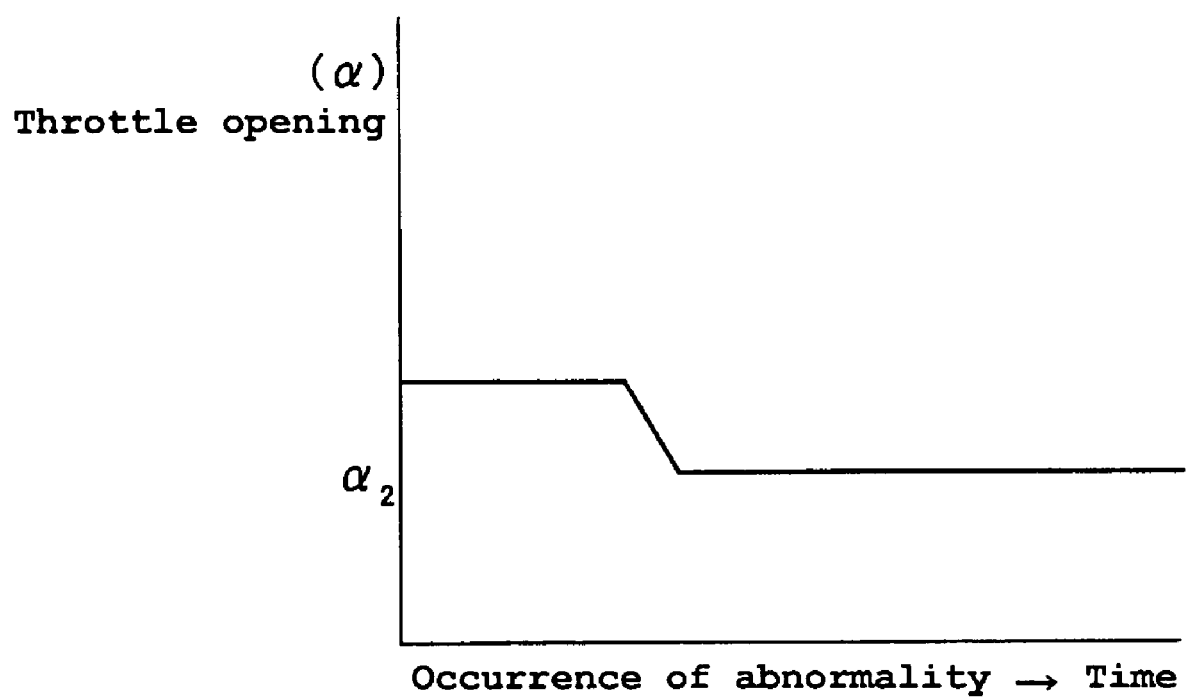
FIG. 14 is a graph showing exemplary fluctuations in the intake air amount when the throttle valve is pivoted to its closed side.
Figure 15:
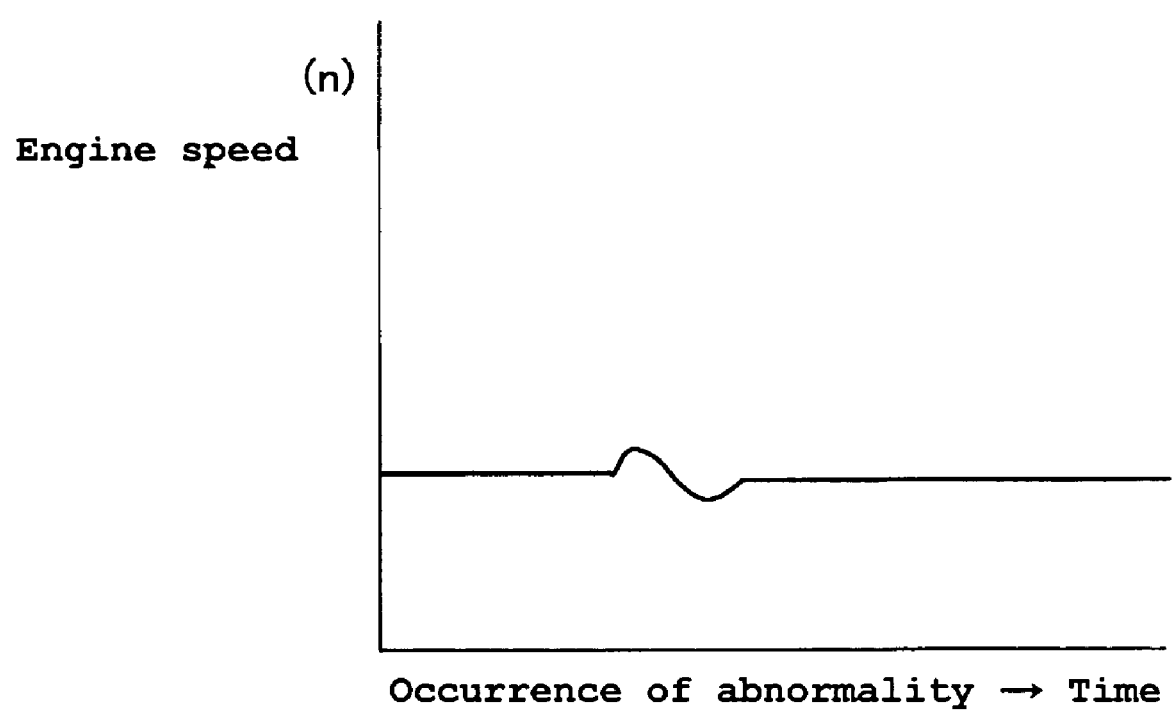
FIG. 15 is a graph showing exemplary fluctuations in the engine speed when the throttle valve is pivoted to its closed side.

Also, if the throttle opening α becomes greater than the mechanically neutral position α2 when the abnormality occurs, the throttle valve 24 moves toward the mechanically neutral position α2 to make the opening smaller. Thus, the throttle opening αbecomes smaller from the occurrence of the abnormality as shown in FIG. 14. At this time, the fuel injection amount is temporarily excessive. Thus, as shown in FIG. 15, the engine speed n momentarily rises and then falls with the decrease of the intake air amount. Then, the engine speed n again rises after a certain period elapses to reach a fixed value according to the intake air amount and the fuel injection amount. Because no large fluctuations occur in the engine speed n also on this occasion, the engine 22 can keep its stable operation without causing the engine stop.

Figure 16:
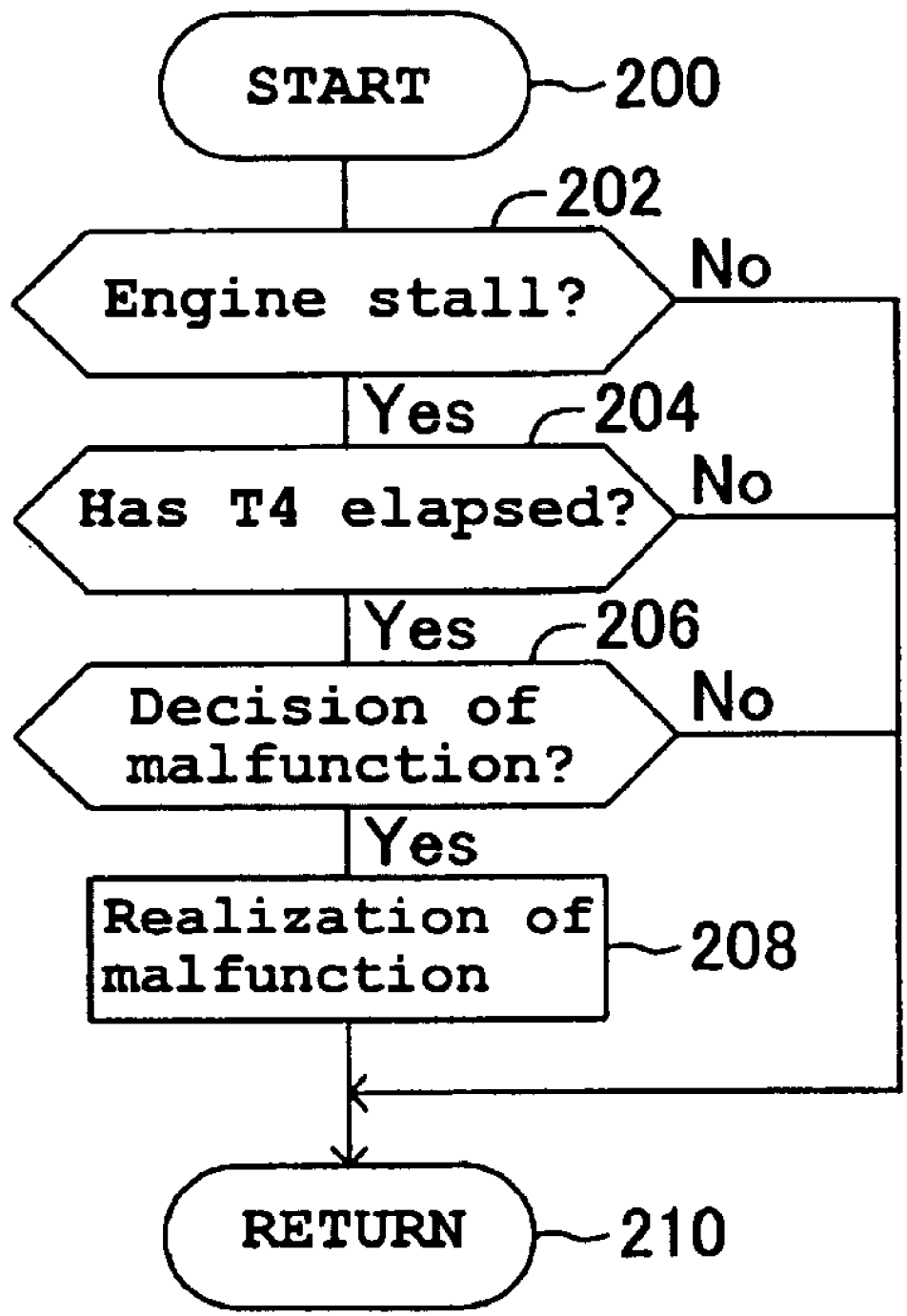
FIG. 16 is a flowchart illustrating a program that can be conducted from an engine stop until realization of a malfunction, in conjunction with some embodiments of the present engine control device.

Also, even if the engine 22 stops, the ECU 30 is supplied with the power for a certain period. Therefore, during the certain period, the detection of the abnormality can be made from the signals of the detection values are transmitted to the ECU 30 from the operation amount detecting sensors 21a, 21b or the throttle opening sensors 32a, 32b. This process is conducted during a certain period that is interposed between the engine stop and the malfunction realization of a flowchart of a program shown in FIG. 16.

That is, the program is started at a Step 200, and at a Step 202, a determination is made as to whether or not the engine 22 has stopped. The determination can be made based upon the detection value of the rotational speed sensor 31a. If the engine 22 has not stopped, "NO" is the result of the determination, and the program proceeds to a Step 210 to temporarily end and/or return. The program is again started from the Step 200, and the regular engine control is conducted until the engine 22 stops.

When the engine 22 stops and "YES" is the result at the Step 202, the program proceeds to a Step 204 to make a determination as to whether or not a time T4 has elapsed. If the time T4 has not elapsed, "NO" is the result and the program proceeds to the Step 210 to stop.

The processes of the Steps 200–204 are then repeated until the time T4 elapses. When the time T4 has elapsed then "YES" is the result at the Step 204 and the program proceeds to a Step 206 to make a determination whether the malfunction has occurred or not.

The malfunction decision can be made by determining whether or not the period for switching to the limp-home ignition timing control has elapsed after the occurrence of the above-described abnormality. If the malfunction is decided, the program proceeds to a Step 208 to conduct a process to realize the malfunction, and then proceeds to the Step 210 to end and/or return. Also, if the malfunction is not decided and "NO" is the result at the Step 206, the program proceeds to the Step 210 to end and/or return.

Then, the above-described processes are repeated until the malfunction is decided. The time T4 is set to, for example, but without limitation, two seconds, and the abnormality is detected during this time. In this manner, even if the engine 22 stops due to the occurrence of the abnormality, the boat operator can identify a cause of the stop of the engine 22.

Figure 17:
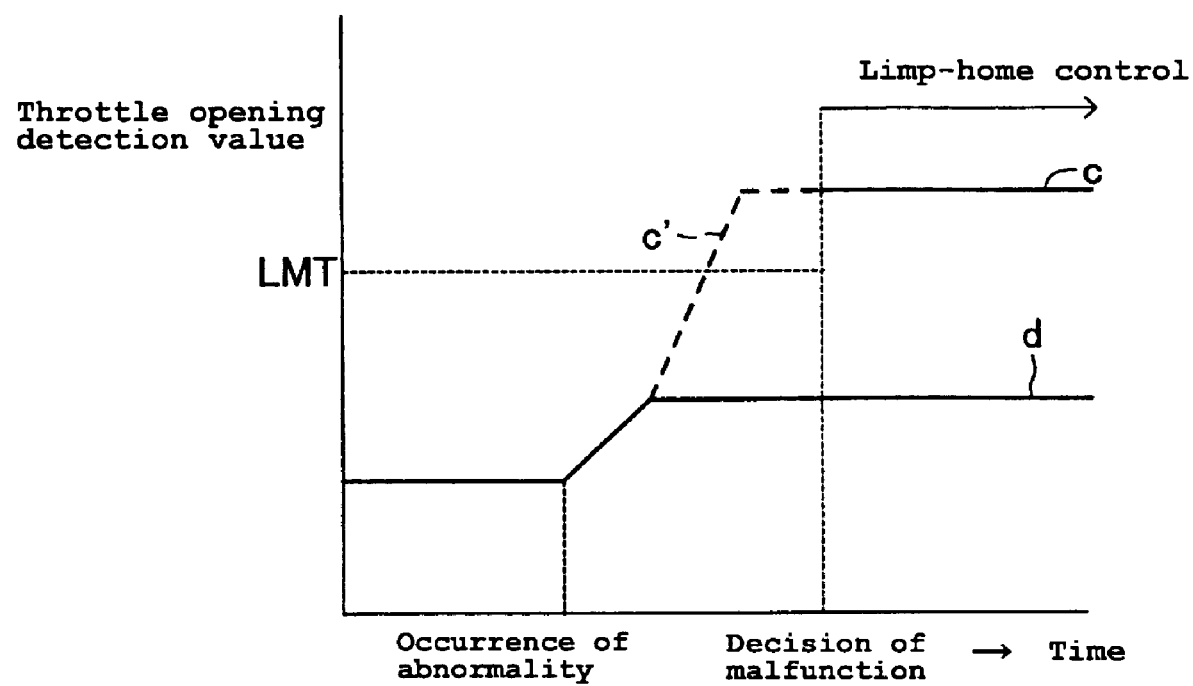
FIG. 17 is a graph showing exemplary detection values from a pair of throttle opening sensors at the time of an abnormality.

Also, in the engine control device 20 according to the present embodiment, the acceleration adjustment for the engine 22 conducted by the fuel injection control and the ignition timing control can be inhibited during the period up to the time when the ignition timing control is switched from the regular ignition timing control to the limp-home ignition timing control after the occurrence of the abnormality. For example, as shown in FIG. 17, an upper limit value LMT is given to the detection values of the two throttle opening sensors 32a, 32b.

When a difference not less than the abnormality determination threshold value appears between the detection values c, d of the two throttle opening sensors 32a, 32b due to the occurrence of the malfunction, and either detection value, for example, the detection value c of the throttle opening sensor 32a exceeds the upper limit value LMT, a control is conducted in which the broken line c' portion of the detection value c is neglected. In this manner, the acceleration adjustment that can occur due to the malfunctioning throttle opening sensors 32a, 32b despite that the throttle valve 24 is driven toward the closed side when the abnormality occurs can be prevented. In this manner, the engine stop due to a large change of the action of the engine 22 can be prevented and the operation of the engine can be stabilized.

As thus described, in the watercraft 10 including the engine control device 20 according to at least some of the present embodiments, the switching from the regular ignition timing control to the limp-home ignition timing control is not made instantly but is made gradually or "stepwise" over a preset time period. Thus, the events in which the watercraft 10 abruptly accelerates due to the sudden increase of the intake air amount, or the engine stop occurs due to insufficient fuel injection can be prevented. Also, not only by switching the ignition timing control from the regular ignition timing control to the limp-home ignition timing control, but also by switching the fuel injection amount and the fuel injection timing from the regular fuel injection control to the fuel injection control suitable for limp-home occasions, the adjustment can be made so that the engine speed n changes more suitably.

Also, in at least some of the present embodiments, the process to bring the relay 38 to the OFF state after the abnormality occurs can be conducted simultaneously with the occurrence of the abnormality, the throttle opening α comes to the mechanically neutral position α2 to bring the motor 24b to an inoperable condition. Thus, the motor 24b is prevented from operating according to the detection values of the operation amount detecting sensors 21a, 21b which have become abnormal. Because, according to this manner, no water return by the exhaust pulsation occurs, any damage to the engine 22 by water invasion can be also prevented.

Also, in at least some of the embodiments, the respective pairs of the operation amount detecting sensors 21a, 21b and the throttle opening sensors 32a, 32b are included. Simultaneous malfunction of such sensors is rare, and normally, either one can be kept under its normal condition even if the other one malfunctions. Thus, even if the abnormality of the opening occurs with the throttle valve 24 and the opening of the throttle valve 24 comes to the mechanically neutral position α2, the basic ignition timing θ1 can be controlled according to the detection value of at least one of the pair of the operation amount detecting sensors 21a, 21b not malfunctioning, to change the rotational speed of the engine 22.

Thus, even on an occasion that the limp-home ignition timing control is conducted due to the occurrence of the abnormality, when the boat operator makes the acceleration operation with, for example, the throttle lever 21, the rotational speed of the engine 22 can be raised based upon the intention of the boat operator. Thus, a quick limp-home can be done.

A further constructive feature of at least some of the embodiments disclosed herein is that acceleration adjustment for the engine conducted by the fuel injection control device and the ignition timing control device is inhibited while the ignition timing control conducted by the ignition timing control device is in the limp-home ignition timing control after the occurrence of the abnormality.

For instance, when the abnormality occurs, if the acceleration adjustment is conducted by a malfunctional action of the operation amount detecting device or the throttle opening detecting device despite that the throttle valve is driven toward the closed side, the intake air amount decreases to make a condition that the fuel is excessive. Therefore, the engine stop is likely to happen. Thus, through inhibiting the acceleration adjustment of the engine conducted by the fuel injection control device and the ignition timing control device, the engine operation is prevented from changing greatly, to stabilize the engine operation. The engine stop due to excessive fuel happens less frequently, accordingly.

Another advantageous feature of at least some of the embodiments disclosed herein is that the switching from the regular ignition timing control to the limp-home ignition timing control is made by retarding the ignition timing, if the opening of the throttle valve at the occurrence of the abnormality is smaller than the opening of the throttle valve with the throttle valve in the mechanically neutral position. For instance, if the abnormality occurs while the throttle valve is in an idle position, unless the ignition timing is under the retarding control (retarded), the intake air amount increases to raise the engine speed. Thus, through retarding the ignition timing, the engine speed can be inhibited from rising and the occurrence of the engine stop can be prevented.

Another advantage provided by at least some of the embodiments disclosed herein is that electric power is supplied for a certain period after the engine has stopped. Normally, if the engine stops, the electric power is still supplied to an electric control device (ECU) and so forth for a fixed time. By detecting the abnormality from the detection value of the operation amount detecting device, the throttle opening detecting device and so forth during that time, the abnormality can be detected, even if the engine stops due to the occurrence of the abnormality.

In at least some of he embodiments disclosed herein, even if the abnormality of the opening occurs with the throttle valve and the opening of the throttle valve comes to the mechanically neutral position, the ignition timing can be changed according to the operation amount of the operating member that is detected by at least one of the pair of operation amount detecting devices not malfunctioning, so as to change the engine speed.

For instance, if the abnormality of the throttle opening control occurs while the throttle valve is in the idle position, the engine speed with the opening of the throttle valve in the mechanically neutral position is higher than the engine speed in the idle condition. Thus, the engine speed increases; however, the ignition timing is retarded to inhibit the increase. Under the above-described condition, the engine speed can be increased based upon the intention of the boat operator when the operator operates the operating member. Thus, the prompt limping home can be made.

Yet another further advantage of at least some of the embodiments disclosed herein is that electric power to the motor is shut off and the opening of the throttle valve is brought to the mechanically neutral position, when the throttle valve is uncontrollable between the open and closed positions due to the occurrence of the abnormality. With this construction, the engine out put can be effectively inhibited by the limp-home mechanism, even when the abnormality of the throttle valve opening occurs. On this occasion, although another idea is applicable that the engine output is inhibited by a cylinder pause and so forth. According to this alternative, in such small boats or the like, water can flow backward due to exhaust pulsation so that the engine can be damaged. By shutting off the electric power to the motor to bring the opening of the throttle valve to the mechanically neutral position, the damage of the engine can be prevented.

Another further advantage of at least some of the embodiments disclosed herein is that an abnormality is determined to have occurred when a difference between the detection value of the operation amount detecting device and the detection value of the throttle opening detecting device exceeds a preset value. Because, with this construction, an abnormality of the throttle valve opening is determined to have occurred when a difference between the detection value of the operation amount detecting device and the detection value of the throttle opening detecting device exceeds a preset threshold value, the abnormality of the throttle valve opening can be more accurately and easily detected.

The engine control device 20 according to the present invention is not limited to the embodiment described above and can be practiced in other embodiments or environments of use with proper modifications. For instance, although the engine control device 20 is mounted onto the watercraft 10 in the embodiment described above, the engine control device 20 can be used not only for the watercraft 10 but also for other small boats and various vehicles such as motorcycles, automobiles, snowmobiles and so forth. Also, regarding respective portions or the like that form the present invention, the embodiment described above does not limit the scope thereof, and they can be properly modified within the technical scope of the present invention.

Further, although the present inventions have been disclosed in the context of certain preferred embodiments, features, aspects, and examples, it will be understood by those skilled in the art that the present inventions extend beyond the specifically disclosed embodiments to other alternative embodiments and/or uses and obvious modifications and equivalents thereof. In addition, while a number of variations have been shown and described in detail, other modifications, which are within the scope of the present inventions, will be readily apparent to those of skill in the art based upon this disclosure. It is also contemplated that various combinations or subcombinations of the specific features and aspects of the embodiments may be made and still fall within the scope of the present inventions. Accordingly, it should be understood that various features and aspects of the disclosed embodiments can be combined with or substituted for one another in order to form varying modes of the present inventions. Thus, it is intended that the scope of the present inventions herein disclosed should not be limited by the particular disclosed embodiments described above.

What is claimed is:

1. An engine comprising a throttle valve configured to adjust an amount of air supplied to the engine, an operating member, an operation amount detecting device configured to detect an operation amount of the operating member, a motor configured to drive the throttle valve between open and closed positions according to a detection value detected by the operation amount detecting device, a throttle opening detecting device configured to detect an opening of the throttle valve, a limp-home mechanism configured to keep the opening of the throttle valve in a mechanically neutral position when an abnormality occurs in which a normal throttle opening control for the throttle valve is not available, an ignition timing control device configured to switch an ignition timing control for the engine from a regular ignition timing control to a limp-home ignition timing control conducted according to an amount of intake air with the opening of the throttle valve in the mechanically neutral position when the opening of the throttle valve is in the mechanically neutral position due to occurrence of the abnormality, and an ignition timing control changing device configured to change the ignition timing control stepwise through a plurality of steps over a predetermined time period, when the ignition timing control conducted by the ignition timing control device is switched from the regular ignition timing control to the limp-home ignition timing control.

2. The engine according to claim 1 additionally comprising a fuel injection control device configured to switch an injection control for fuel supplied to the engine from a regular fuel injection control to a limp-home fuel injection control conducted according to the amount of intake air with the opening of the throttle valve in the mechanically neutral position when the opening of the throttle valve is in the mechanically neutral position due to occurrence of the abnormality, and fuel injection control changing means for changing the fuel injection control stepwise over a predetermined time period, when the fuel injection control conducted by the fuel injection control device is switched from the regular fuel injection control to the limp-home fuel injection control.

3. The engine according to claim 2, wherein the fuel injection control device and the ignition timing control device are configured to inhibit acceleration adjustment for the engine while the ignition timing control conducted by the ignition timing control device is in the limp-home ignition timing control after the occurrence of the abnormality.

4. The engine according to claim 1, wherein the ignition timing control changing device is configured to switch from the regular ignition timing control to the limp-home ignition timing control by retarding the ignition timing, if the opening of the throttle valve at the occurrence of the abnormality is smaller than the opening of the throttle valve with the throttle valve in the mechanically neutral position.

5. The engine according to claim 1 additionally comprising a power control device configured to supply power for a time period after the engine has stopped.

6. An engine comprising a throttle valve configured to adjust an amount of air supplied to the engine, an operating member, at least a pair of operation amount detecting devices configured to detect an operation amount of the operating member, a motor configured to move the throttle valve between open and closed positions according to a detection value detected by the operation amount detecting device, at least a pair of throttle opening detecting devices configured to detect an opening of the throttle valve, a limp-home mechanism configured to maintain the opening of the throttle valve in a mechanically neutral position when an abnormality occurs in which a normal throttle opening control for the throttle valve is not available, an ignition timing control device configured to switch an ignition timing control for the engine from a regular ignition timing control to a limp-home ignition timing control conducted according to an amount of intake air with the opening of the throttle valve in the mechanically neutral position when the opening of the throttle valve is in the mechanically neutral position due to occurrence of the abnormality, and limp-home ignition timing changing means for changing a rotational speed of the engine, when the ignition timing control conducted by the ignition timing control device is switched to the limp-home ignition timing control due to occurrence of the abnormality resulting from a malfunction of any one of the pair of operation amount detecting devices or the pair of throttle opening detecting devices, by changing the ignition timing according to a detection value detected by at least one of the pair of operation amount detecting devices not malfunctioning.

7. The engine according to claim 6 additionally comprising a fuel injection control device configured to switch an injection control mode of fuel supplied to the engine from a regular fuel injection control mode to a limp-home fuel injection control mode conducted according to the amount of intake air with the opening of the throttle valve in the mechanically neutral position, when the opening of the throttle valve is in the mechanically neutral position due to occurrence of the abnormality, and limp-home fuel injection control changing means for changing the rotational speed of the engine, when the limp-home ignition timing control is conducted due to occurrence of the abnormality resulting from a malfunction of any one of the pair of operation amount detecting devices or the pair of throttle opening detecting devices, by changing the fuel injection control according to a detection value detected by at least one of the pair of operation amount detecting devices not malfunctioning.

8. The engine according to claim 6 additionally comprising a power controller configured to shut off the motor, wherein the opening of the throttle valve is brought to the mechanically neutral position, when the throttle valve motor is uncontrollable between the open and closed positions of the throttle valve due to the occurrence of the abnormality.

9. The engine according to claim 6 additionally comprising an abnormality detection device configured to detect an abnormality based on whether a difference between the detection value of the operation amount detecting device and the detection value of the throttle opening detecting device exceeds a preset value.

10. The engine according to claim 6 additionally comprising an abnormality detection device, wherein the pair of throttle opening detecting device comprises two opening sensors, and wherein the abnormality detection device is configured to determine an abnormality to have occurred when a difference between the detection values of the two opening sensors exceeds a preset value.

11. The engine according to claim 6, in combination with a water jet propulsion boat.

12. The engine according to claim 6, wherein the ignition timing control changing device is configured to change the ignition timing control stepwise through a plurality of steps over a predetermined time period, when the ignition timing control conducted by the ignition timing control device is switched from the regular ignition timing control to the limp-home ignition timing control.

* * * * *